(12) United States Patent
Panov et al.

(10) Patent No.: US 12,267,020 B2
(45) Date of Patent: Apr. 1, 2025

(54) ISOLATED RESONANT DC-DC CONVERTER

(71) Applicant: Delta Electronics, Inc., Taipei (TW)

(72) Inventors: Yuri Panov, Research Triangle Park, NC (US); Peter Mantovanelli Barbosa, Research Triangle Park, NC (US); Yihua Chang, Taoyuan (TW); Kai Dong, Shanghai (CN)

(73) Assignee: Delta Electronics, Inc., Taipei (TW)

( * ) Notice: Subject to any disclaimer, the term of this patent is extended or adjusted under 35 U.S.C. 154(b) by 21 days.

(21) Appl. No.: 18/242,797

(22) Filed: Sep. 6, 2023

(65) Prior Publication Data

US 2023/0412085 A1  Dec. 21, 2023

Related U.S. Application Data

(62) Division of application No. 17/482,981, filed on Sep. 23, 2021, now Pat. No. 11,791,733.

(51) Int. Cl.
*H02M 3/335* (2006.01)
*H02M 1/00* (2006.01)
(Continued)

(52) U.S. Cl.
CPC ..... *H02M 3/33573* (2021.05); *H02M 1/0009* (2021.05); *H02M 1/08* (2013.01);
(Continued)

(58) Field of Classification Search
CPC .............. H02M 3/01; H02M 3/33571; H02M 3/33573; H02M 1/0009; H02M 1/08; H02M 1/14
(Continued)

(56) References Cited

U.S. PATENT DOCUMENTS

| 5,570,276 A | 10/1996 | Cuk et al. |
| 7,019,503 B1 | 3/2006 | Ortiz et al. |

(Continued)

FOREIGN PATENT DOCUMENTS

| CN | 108696140 A | 10/2018 |
| TW | I465027 B | 12/2014 |

(Continued)

OTHER PUBLICATIONS

J.- H. Jung, et al., "Design Methodology of Bidirectional CLLC Resonant Converter for High-Frequency Isolation of DC Distribution Systems", IEEE Transactions on Power Electronics, vol. 28, No. 4, pp. 1741-3086, Apr. 2013.

(Continued)

*Primary Examiner* — Yemane Mehari
(74) *Attorney, Agent, or Firm* — KIRTON McCONKIE; Evan R. Witt

(57) ABSTRACT

An isolated DC-DC converter is provided. The isolated DC-DC converter includes a full-bridge switching stage, a resonant network, a transformer, an output stage, an isolated charge sensor and a switch controller. The full-bridge switching stage has at least four active switches. The resonant network has a plurality of inductors and plurality of capacitors. The transformer is connected to the resonant network. The output stage is connected to the transformer and is configured to generate an output voltage or current. The isolated charge sensor is connected to the resonant network to generate a resonant inductor current charge signal. The switch controller generates and provides control signals to the at least four active switches based on at least the resonant inductor current charge signal and the output voltage or current.

14 Claims, 22 Drawing Sheets

(51) Int. Cl.
  *H02M 1/08* (2006.01)
  *H02M 1/14* (2006.01)
  *H02M 3/00* (2006.01)
(52) U.S. Cl.
  CPC .............. *H02M 1/14* (2013.01); *H02M 3/01* (2021.05); *H02M 3/33571* (2021.05)
(58) Field of Classification Search
  USPC ........................................................ 323/271
  See application file for complete search history.

(56) References Cited

U.S. PATENT DOCUMENTS

| | | | |
|---|---|---|---|
| 7,548,435 | B2 | 6/2009 | Mao |
| 7,656,691 | B2 | 2/2010 | Nielsen et al. |
| 8,737,092 | B2 | 5/2014 | Adragna |
| 9,019,725 | B2 | 4/2015 | Cantoro |
| 9,729,072 | B2 | 8/2017 | Lee et al. |
| 9,929,663 | B1 * | 3/2018 | Babazadeh ....... H02M 3/33592 |
| 2015/0180345 | A1 * | 6/2015 | Frost ................... H02M 3/3376 363/21.02 |
| 2016/0373015 | A1 | 12/2016 | Deng et al. |
| 2018/0152111 | A1 * | 5/2018 | Tschirhart ......... H02M 3/33592 |
| 2020/0083813 | A1 * | 3/2020 | Tang ................. H02M 3/33553 |
| 2020/0366215 | A1 | 11/2020 | Chen et al. |

FOREIGN PATENT DOCUMENTS

| | | |
|---|---|---|
| TW | 202037054 A | 10/2020 |
| WO | 2011055285 A2 | 6/2011 |

OTHER PUBLICATIONS

W. Chen, et al., "Snubberless Bidirectional DC-DC Converter With New CLLC Resonant Tank Featuring Minimized Switching Loss", IEEE Transactions on Industrial Electronics, vol. 57, No. 9, pp. 3075-3086, Sep. 2010.

Z.-U. Zahid, et al., "Design of Bidirectional DC-DC Resonant Converter for Vehicle-to-Grid (V2G) Applications", IEEE Transactions on Transportation Electrification, vol. 1, No. 3, pp. 232-244, Oct. 2015.

C. H. Park, et al., "Average Current Mode Control for LLC Series Resonant DC-to-DC Converters," Journal of Power Electronics, vol. 14, No. 1, pp. 40-47, Jan. 2014.

V. T. Ranganathan, et al., "A Regulated DC-DC Voltage Source Converter Using a High Frequency Link", IEEE Transactions on Industry Applications, vol. IA-18, No. 3, pp. 279-244, May-Jun. 1982.

F. C. Schwarz, "An Improved Method of Resonant Current Pulse Modulation for Power Converters," IEEE Trans. Ind. Electron. Contr. Instrum., vol. IECI-23, No. 2, pp. 133-141, May 1976.

R. Oruganti, et al., "Implementation of Optimal Trajectory Control of Series Resonant Converter", IEEE Transactions on Power Electronics, vol. 3, No. 3, pp. 318-327, Jul. 1988.

R. Oruganti, et al., "Resonant Power Processors, Part II—Methods of Control", IEEE Transactions on Industry Applications, vol. IA-21, No. 6, pp. 1461-1471, Nov.-Dec. 1985.

R. King, et al., "Inherent overload protection for the series resonant converter," IEEE Transactions on Aerospace Electronic Systems, vol. AES-19, No. 6, pp. 820-830, Nov. 1983.

J. Jang, et al., "Current Mode Control for LLC Series Resonant DC-to-DC Converters," Energies, No. 8, pp. 6098-6113, Jun. 2015.

H. Choi, "Charge Current Control for LLC Resonant Converter," in IEEE 2015 Applied Power Electronics Conference, 2015, pp. 1448-1452.

J. Hu, et al., "Cycle-by-Cycle Average Input Current Sensing Method for LLC Resonant Topologies," in IEEE Energy Conversion Congress and Exposition, 2013, pp. 167-174.

J. Hu , et al., "Bang-Bang Charge Control for LLC Resonant Converters," IEEE Transactions on Power Electronics, vol. 30, Issue: 2, Feb. 2015.

Y. Li, et al., "A Novel LLC Resonant Controller with Best-In-Class Transient Performance and Low Standby Power Consumption," in IEEE Applied Power Electronics Conference, 2018, pp. 489-493, Mar. 2018.

C. Adragna, et al., "Cycle-by-Cycle Average Input Current Control of Resonant Converters", 2020 International Symposium on Power Electronics, Electrical Drives, Automation and Motion (SPEEDAM), Sorrento, Italy, pp. 839-845, Jun. 2020.

S.-W. Kang, et al., "Digitally Implemented Charge Control for LLC Resonant Converters," IEEE Transactions on Industrial Electronics, vol. 64, No. 8, pp. 6159-6168, Aug. 2017.

H. Choi, "Charge Current Control for LLC Resonant converter," IEEE 2015.

* cited by examiner

ISOLATED RESONANT DC-DC CONVERTER

CROSS-REFERENCE TO RELATED APPLICATION

This application is a Divisional application of U.S. patent application Ser. No. 17/482,981 filed on Sep. 23, 2021 and entitled "ISOLATED RESONANT DC-DC CONVERTERS AND CONTROL METHODS THEREOF". The entire contents of the above-mentioned patent applications are incorporated herein by reference for all purposes.

FIELD OF THE INVENTION

The present disclosure relates to an isolated resonant DC-DC power converter. More particularly, the present disclosure relates to an isolated DC-DC resonant power converter for improving transient response and suppress low-frequency output voltage ripple.

BACKGROUND OF THE INVENTION

Generally, switching-mode resonant DC/DC converters have low switching losses of their switches and, therefore, can operate very efficiently at high frequency that also allows size reduction of their magnetic components and capacitors. Today, resonant isolated DC-DC converters are widely used in many applications which require high efficiency and isolation between the input and output ports of the converter. As shown in FIG. 1, the isolated resonant DC-DC converter includes a primary switching stage, a primary resonant circuit, a transformer TR, a secondary resonant circuit, a secondary switching stage, and an output filter. The most common implementations of the primary switching stage are full-bridge chopper and half-bridge chopper. Most common implementations of the primary resonant network are LC network, LLC network, and CLC network. Secondary resonant network is typically employed in CLLC bidirectional resonant converters. Refs. [1]-[3]. Most common implementations of secondary switching stage are full-bridge stage, center-tapped stage, or voltage-doubler stage.

FIG. 2 is a circuit diagram of a conventional LLC resonant DC-DC power converter. Its primary switching stage includes a full-bridge circuit comprised of MOSFET switches S1-S4. Its primary resonant network includes inductors $L_R$, $L_M$, and capacitor $C_R$. For unidirectional power transfer, the LLC converter in FIG. 2 does not require a secondary resonant stage and its secondary switching stage includes diodes D1-D4. Its output CLC filter includes inductance $L_O$ and capacitors $C_{O1}$ and $C_{O2}$.

FIG. 3 is a block diagram of a conventional half-bridge LLC resonant DC-DC converter with direct frequency control. So far, direct frequency control (DFC) is the most popular and mature control method for resonant converters, where output voltage regulation is achieved by directly varying switching frequency. As shown in FIG. 3, voltage sensor senses and scales output voltage $V_O$ and the sensor output voltage is compared to reference voltage $V_{REF}$. The difference between voltage $V_{REF}$ and sensed output voltage is processed by error amplifier (EA). EA output voltage $V_{EA}$ is applied to the input of voltage-controlled oscillator (VCO), whose output is a square-wave pulse train of the frequency determined by voltage $V_{EA}$. Switch control circuit in FIG. 3 produces driving signals for switches S1-S4, which operate with the same nearly 50% duty cycle. For a full-bridge primary switching network, driving signals of switches S1, S4 are the same, as well as driving signals of switches S2, S3. As can be seen from FIG. 3, DFC is essentially a single-loop feedback control.

However, DFC control-to-output transfer function GVC, defined as $V_O/V_{EA}$, strongly depends on converter input voltage $V_{IN}$ and load current $I_O$. Due to the strong dependence of transfer function $G_{VC}$ on the operating condition, it is not possible to design wide-bandwidth control loop which has adequate stability margins in all operating points. This limitation of frequency control loop bandwidth causes poor converter transient response to fast changes of the input voltage and the load current. Also in switching ac-dc power supplies, where the resonant converter is used as the DC-DC stage, there is a considerable low-frequency input voltage ripple at the DC-DC stage input. The ripple frequency is doubled with respect to the ac line frequency and is approximately in the 100-120 Hz range (for typical ac sources). The low-frequency input ripple propagates to the output where it can be the dominant part of the total output ripple whose magnitude is limited by the ac-dc power supply specifications. The attenuation of the low-frequency ripple strongly depends on the DFC loop gain magnitude in 100-120 Hz range which could be insufficient because of the narrow DFC bandwidth.

In the past, there have been two published major approaches to improve the resonant converter transient response and reduce the low-frequency output voltage ripple. The first approach is combination of the direct frequency feedback control (DFC) and input voltage feedforward control (VFC). Ref. [4]. FIG. 4 shows one of the configurations of combined control described in Ref. [4]. Input voltage $V_{IN}$ is sensed and processed by feedforward controller whose output signal $V_{FF}$ is summed with output signal $V_{EA}$ of feedback controller. The resulting control signal $V_{CONT}$ is applied to the VCO input. The feedforward control path provides much faster way to change control signal $V_{CONT}$ in response to disturbance of input voltage $V_{IN}$ than the DFC path, where the input voltage disturbance first has to propagate through the power stage to the output, push output voltage $V_O$ from its steady-state value and, then, be further processed by the EA to produce control signal $V_{CONT}$. FIG. 5 is a small-signal block diagram of a conventional LLC resonant converter with direct frequency control and input voltage feedforward control. To determine ideal transfer function of the feedforward control, the small-signal block diagram of FIG. 5 for the combined control in FIG. 4 is employed. As shown in FIG. 5, the block diagram includes:

1. transfer function $G_{VV}$ from input voltage $V_{IN}$ to output voltage $V_O$ with feedback and feedforward control paths opened;
2. transfer function $G_{VC}$ from control voltage $V_{CONT}$ to output voltage $V_O$;
3. transfer function $K_D$ of the output voltage sensor;
4. transfer function $G_{EA}$ of error amplifier;
5. combined transfer function $G_{FV}^{FC}$ of input voltage sensor and feedforward controller;

Transfer function $G_{VV}^{CL}$ from input voltage VIN to output voltage VO with feedback and feedforward paths closed is derived from the block diagram in FIG. 5 as $$G_{VV}^{CL} = \frac{V_O}{V_{IN}} = \frac{G_{VV} + G_{FV}^{FC} \cdot G_{VC}}{1 + T_V}, \quad (1)$$

where $T_V = K_D \cdot G_{EA} \cdot G_{VC}$ is the feedback loop gain.

Equation (1) indicates that complete cancellation of the small-signal input voltage disturbance is possible when $$G_{FV}^{FC} = -G_{VV}/G_{VC}. \quad (2)$$

It should be noted that ideal small-signal feedforward control transfer function $G_{FV}^{FC}$, defined by equation (2), cannot completely cancel the real-life input disturbance for two major reasons:
1. Both power stage and feedback frequency control are nonlinear blocks and their large-signal behavior cannot be adequately represented by small-signal transfer functions $G_{VV}$ and $G_{VC}$ which depend on converter operating point, namely, on the input voltage and the output current;
2. Since both transfer functions $G_{VV}$ and $G_{VC}$ are frequency dependent, the ideal transfer function $G_{FV}^{FC}$ if is also frequency dependent. The accurate implementation of its all poles and zeroes could be too complex for practical feedforward control.

FIG. 6 shows Bode plots of an ideal input voltage feedforward control transfer function $G_{FF}$. The Bode plots of this idealized model are provided as an example in Ref. [4]. The transfer function $G_{FV}^{FC}$ if in FIG. 6 has flat gain and close-to-zero phase in the frequency range from zero to 10 kHz. Therefore, it is possible to approximate the ideal transfer function $G_{FF}$ by its dc gain, i.e., the proportional feedforward controller with its simple implementation can be used. This property of the ideal transfer function is determined by transfer functions $G_{VV}$ and $G_{VC}$ which depend on the power stage and also on the feedback control used.

As stated in Ref. [4], the objective of the combined feedback and line feedforward controls is the reduction of low-frequency output voltage ripple. This combined control solution is expected to be effective for improvement of the LLC resonant converter response to the other input voltage disturbances. However, it is obviously not capable of improving the converter response to load current disturbances.

FIG. 7 is a block diagram of a conventional zero-voltage-switching DC-DC converter with two-loop control. The two-loop control is disclosed in Ref. [5] to improve dynamic performance of the resonant zero-voltage-switching converter. As shown in FIG. 7, a zero-voltage-switching converter 1 is connected to one load circuit 2, 3. The zero-voltage-switching converter 1 feeds the load circuit 2, 3 and comprises a chopper 4, a driver 5 connected to the chopper 4 for driving the chopper 4, and a resonant tank 6 connected to the chopper 4. A feedback circuit has no oscillator and comprises an arrangement 10 coupled to the resonant tank 6 for receiving a first signal derived from a resonant tank signal and coupled to the load circuit 2, 3 for receiving a second signal derived from a load circuit signal. The arrangement 10 generates, in response to the first and second signals, a control signal for the driver 5. Between the chopper 4 and the resonant tank 6, and/or between the resonant tank 6 and the load circuit 2, 3, further blocks, not shown, may be present, such as a transformer circuit, a rectifier circuit, a filter circuit, a measurement circuit, etc. The chopper 4 for example comprises a full bridge or a half bridge or a full bridge operated in a half bridge mode. A combination of the zero-voltage-switching converter 1 and the feedback circuit for example forms a self-oscillating converter.

In one configuration, the feedback circuit is defined by the resonant tank signal being a voltage across or a current flowing through one or more elements of the resonant tank, and the load circuit signal being a voltage across or a current flowing through one or more elements of the load circuit. An element of the resonant tank may be a capacitor or a coil or a resistor. An element of the load circuit may be a load or a resistor.

Refs. [6]-[10] provide additional information relevant to the practical implementations of the resonant converter two-loop control.

FIG. 8 is a block diagram of a conventional half-bridge LLC resonant DC/DC converter with the average-current-mode control. Current-mode control is another major approach to improve the resonant converter transient response and reduce the low-frequency output voltage ripple. Refs. [11]-[12]. In addition to DFC voltage feedback loop, there is a second feedback loop in FIG. 8. The second loop includes the sensor of resonant inductor current $I_{LR}$, whose output voltage $V_{CS}$ is the input to the current processor. The current processor output voltage $V_{CF}$ is then subtracted from output voltage $V_{EA}$ of error amplifier EA. Different from PWM converters with a triangular inductor current waveform, resonant converters have resonant shape of inductor current $I_{LR}$ waveform whose peak value does not coincide in time with turn-on/turn-off of primary switches S1 and S2. Therefore, peak-current-mode control is not used for resonant converters. However, the average-current-mode control is applicable to the resonant converters. In the case of average-current-mode control, current processor rectifies and averages the sensed inductor current $I_{LR}$. The current averaging introduces significant phase delay in the current loop which limits the current loop bandwidth. Therefore, improvement of the transient response of resonant converters with the described average-current-mode control is quite limited.

Another, more promising current-mode control implementation is charge control. Ref. [13]-[22]. Different from DFC, the charge control does not have a VCO in the control path and, therefore, controls the switching frequency indirectly. There are two significantly-different implementations of the resonant converter charge control, called CC1 and CC2 in this disclosure. The CC1 implementation (Ref. [13]-[15]) is applied to the half-bridge LLC resonant converter.

FIG. 9 is a block diagram of a conventional half-bridge LLC resonant DC/DC converter with the CC1 implementation. The internal charge control loop produces the control signal $V_{INT}$ proportional to charge Q delivered by resonant inductor current $I_{LR}$ during one half-switching cycle, namely, $$V_{INT}(t) \propto Q(t) = \int_{t_0}^{t} I_{LR}(t)dt,$$

where $t_0$ is the beginning time of the half-switching cycle. Signal $V_{INT}$ in FIG. 9 is summed with compensation ramp signal $V_{RAMP}$. Similar to the peak-current-mode control, the compensation ramp is used to prevent the charge control subharmonic instability.

FIG. 10 shows key control waveforms of a conventional half-bridge LLC resonant DC/DC converter with the CC1 implementation. As shown in FIG. 10, the sum of signals $V_{INT}$ and $V_{RAMP}$ during the conduction time of upper switch S1 ($t_0 < t < t_1$) is compared to error amplifier output voltage $V_{EA}$. When the increasing sum of signals $V_{INT}$ and $V_{RAMP}$ exceeds the $V_{EA}$ level at time instant $t_1$, the output of comparator Cmp changes its state from low to high and switch S1 in FIG. 9 is turned off. The on-time of switch S1 is memorized. After dead-time interval $t_1 < t < t_2$, lower switch S2 is turned-on for the same time, i.e., the times of intervals $[t_0-t_1]$ and $[t_2-t_3]$ are equal. At instant $t_4$, after dead-time interval $t_3 < t < t_4$, the next switching cycle begins.

Signal $V_{INT}$ is related to resonant inductor current, $I_{LR(AVE)}$, averaged within half-switching cycle $t_0 < t < t_2$, which is defined by equation $$I_{LR(AVE)} = \frac{2}{T_S} \cdot \int_{t_0}^{t_2} I_{LR}(t)dt,$$

where $T_S$ is the switching period. Neglecting short dead-time interval $t_1 < t < t_2$, steady-state value of signal $V_{INT}(t_1)$ is proportional to average inductor current $I_{LR(AVE)}$ that shows close relationship between the charge control and the average current control.

Due to the inductor current sensing error and integrator inaccuracy, the deviation of practical $V_{INT}$ signal from the ideal one can increase with time. For this reason, sometimes the reset signal is applied to the integrator every switching cycle to ensure the start of integrator output signal $V_{INT}$ from zero at the beginning of each switching cycle, namely, at $t=t_0, t_4, \ldots$.

In the resonant converters, where the resonant inductor $L_R$ is connected in series with the resonant capacitor $C_R$, voltage $V_{CR}$ across the resonant capacitor is proportional to the integral of resonant inductor current $I_{LR}$, namely, $V_{CR}=1/C_R \cdot \int I_{LR} dt$, sensing and integration of the resonant inductor current are replaced by sensing of the resonant capacitor voltage. Sensing of capacitor voltage $V_{CR}$ is particularly beneficial in the LLC half-bridge resonant converter with the primary-side control, where resonant capacitor $C_R$ is connected to the ground and the power stage and controller can share the same ground.

For the CC1 implementation, the same on-time of switches S1 and S2 is updated once per each switching cycle. For the CC2 implementation (Ref. [16]-[22]), the on-times of switches S1 and S2 are updated during S1 and S2 conduction intervals, respectively. The steady-state values of S1 and S2 on-times are the same during steady-state operation, but can be different during transients.

In Ref. [19], the CC2 implementation is called bang-bang charge control (BBCC). The BBCC for the half-bridge LLC converter, presented in Ref. [19], is represented by the block diagram in FIG. 11 and its key waveforms are shown in FIG. 12. This control is based on sensing of resonant capacitor voltage $V_{CR}$ and input voltage $V_{IN}$. For proper operation of the control, the sensors of the voltages $V_{CR}$ and $V_{IN}$ must have identical gains. The BBCC operates as follows.

Upper switch S1 turns on at time instant to, as shown in FIG. 12. As a result, the resonant capacitor voltage starts increasing after the initial drop. At time instant $t_1$, sensed voltage $K_{SEN} \cdot V_{CR}$ exceeds EA output voltage $V_{EA}$ and the output state of comparator Cmp2 changes from low to high, SR latch in FIG. 12 is reset and switch S1 turns off. After dead-time interval $t_1 < t < t_2$, lower switch S2 turns on. During interval $t_2 < t < t_3$, the resonant capacitor voltage starts decreasing after the initial peaking. At time instant $t_3$, when sensed voltage $K_{SEN} \cdot V_{CR}$ drops below level $K_{SEN} \cdot V_{IN} - V_{EA}$, the output state of comparator Cmp1 changes from low to high, SR latch is set and switch S2 is turned off. After dead-time interval $t_3 < t < t_4$, the next switching cycle begins.

For the charge control, the average value of the sensed current is obtained each switching cycle and, therefore, the charge control response to variation of the sensed current can be very fast and the charge loop bandwidth can be very high. Due to its high bandwidth, the charge control significantly improves the converter response to the input voltage disturbances and reduces the output 100-120-Hz voltage ripple. However, the charge control does not improve the converter response to the load current disturbances as significantly as it improves the response to the input voltage disturbances. This happens because the charge control belongs to the current-mode control family. Namely, the internal current loop substantially increases the converter output impedance with the voltage loop open. Typically, the open-loop output impedance of the converter with the charge control is much higher than that of the converter with direct frequency control. Although the high open-loop output impedance of the converter with the charge control is then drastically reduced by the action of the wide-bandwidth voltage loop, the closed-loop output impedance reduction of the converter with the charge control is not that significant with respect to the one of the converter with the DFC.

REFERENCES

[1] J.-H. Jung, H.-S. Kim, M.-H. Ryu, and J.-W. Baek, "Design Methodology of Bidirectional CLLC Resonant Converter for High-Frequency Isolation of DC Distribution Systems," IEEE Transactions on Power Electronics, vol. 28, no. 4, pp. 1741-3086, April 2013.

[2] W. Chen, P. Rong, and Z. Lu, "Snubberless Bidirectional DC-DC Converter With New CLLC Resonant Tank Featuring Minimized Switching Loss," IEEE Transactions on Industrial Electronics, vol. 57, no. 9, pp. 3075-3086, September 2010.

[3] Z.-U. Zahid, Z.-M. Dalala, R. Chen, B. Chen, and J.-S. Lai, "Design of Bidirectional DC-DC Resonant Converter for Vehicle-to-Grid (V2G) Applications," IEEE Transactions on Transportation Electrification, vol. 1, no. 3, pp. 232-244, October 2015.

[4] S. J. Deng, Q. F. Liu, G. Q. Li, Z. F. Zhou and Z. T Fan, "LLC Resonant Converter and Method for Suppressing Ripples in Output Voltage Thereof," U.S. Patent Pre-Grant Publication No. 2016/0373015 A1, Dec. 22, 2016.

[5] R. Elferich, "Feedback circuit for zero-voltage-switching converter," International Patent WO 2011/055285 A3, May 12, 2011.

[6] V. T. Ranganathan, P. D. Ziogas, and V. R. Stefanovic, "A Regulated DC-DC Voltage Source Converter Using a High Frequency Link," IEEE Transactions on Industry Applications, vol. IA-18, no. 3, pp. 279-244, May-June 1982.

[7] F. C. Schwarz, "An Improved Method of Resonant Current Pulse Modulation for Power Converters," IEEE Trans. Ind. Electron. Contr. Instrum., vol. IECI-23, no. 2, pp. 133-141, May 1976.

[8] R. Oruganti, J. J. Yang, and F. C. Lee, "Implementation of Optimal Trajectory Control of Series Resonant Converter," IEEE Transactions on Power Electronics, vol. 3, no 3, pp. 318-327, July 1988.

[9] R. Oruganti and F. C. Lee, "Resonant Power Processors, Part II—Methods of Control," IEEE Transactions on Industry Applications, vol IA-21, no 6, pp. 1461-1471, November-December 1985.

[10] R. King and T. Stuart, "Inherent overload protection for the series resonant converter," IEEE Transactions on Aerospace Electronic Systems, vol. AES-19, no. 6, pp. 820-830, November 1983.

[11] C. H. Park, S. H. Cho, J. Jang, S. K. Pidaparthy, T. Ahn, and B. Choi, "Average Current Mode Control for LLC Series Resonant DC-to-DC Converters," Journal of Power Electronics, vol. 14, no. 1, pp. 40-47, January 2014.
[12] J. Jang, S. K. Pidaparthy, and B. Choi, "Current Mode Control for LLC Series Resonant DC-to-DC Converters," Energies, no. 8, pp. 6098-6113, June 2015.
[13] H. Choi, "Charge Current Control for LLC Resonant Converter," in IEEE 2015 Applied Power Electronics Conference, 2015, pp. 1448-1452.
[14] W.-T. Lee, H.-S. Baek, J. H. Jang, H.-S. Choi, M.-H. Choi, "Resonant Converter and Driving Method Thereof," U.S. Pat. No. 9,729,072 B2, Aug. 8, 2017.
[15] C. Adragna, "Control Device for a Resonant Converter," U.S. Pat. No. 8,737,092 B2, May 27, 2014.
[16] C. Cantoro, "Control Device for a Resonant Converter," U.S. Pat. No. 9,019,725 B2, Apr. 28, 2015.
[17] J. Hu, Y. F. Liu, and P. C. Sen, "Cycle-by-Cycle Average Input Current Sensing Method for LLC Resonant Topologies," in IEEE Energy Conversion Congress and Exposition, 2013, pp. 167-174.
[18] J. Hu, Y. F. Liu, and P. C. Sen, "Bang-Bang Charge Control for LLC Resonant Converters," IEEE Transactions on Power Electronics, vol. 14, no. 1, pp. 40-47, January 2014.
[19] Y. Li, B. McDonald, "A Novel LLC Resonant Controller with Best-In-Class Transient Performance and Low Standby Power Consumption," in IEEE Applied Power Electronics Conference, 2018, pp. 489-493, March 2018.
[20] R. Nielsen, S. K. Christensen, "Charge Mode Control of a Serial Resonance Converter," U.S. Pat. No. 7,656,691 B2, Feb. 2, 2010.
[21] C. Adragna and A. Bianco, "Cycle-by-Cycle Average Input Current Control of Resonant Converters,", 2020 International Symposium on Power Electronics, Electrical Drives, Automation and Motion (SPEEDAM), Sorrento, Italy, pp. 839-845, June, 2020.
[22] S.-W. Kang, and B.-H. Cho, "Digitally Implemented Charge Control for LLC Resonant Converters," IEEE Transactions on Industrial Electronics, vol. 64, no. 8, pp. 6159-6168, August 2017.

SUMMARY OF THE INVENTION

The present disclosure provides a control method, in which the charge control is combined with input voltage feedforward control and output current feedforward control. It can be shown that the combination of the charge control with the feedforward control performs better than the combination of the DFC with the feedforward control. In particular, the combination of the charge control with the feedforward control has much better load transient response with respect to the load transient response of the combined direct frequency control and feedforward control.

The present disclosure also provides a cost-effective implementation of the charge control in the full-bridge LLC converter with controller located on the secondary side of the isolation transformer. The present disclosure can be implemented using either analog or digital control or both.

In one aspect, an isolated DC-DC converter comprises a full-bridge switching stage having at least four active switches; a resonant network having a plurality of inductors and plurality of capacitors; a transformer connected to the resonant network; an output stage connected to the transformer and configured to generate an output voltage or current; an isolated charge sensor connected to the resonant network to generate a resonant inductor current charge signal; and a switch controller to generate and provide control signals to the at least four active switches based on at least the resonant inductor current charge signal and the output voltage or current.

In one embodiment, the converter further comprises a voltage feedforward controller configured to sense an input voltage to the full-bridge switching stage, wherein, the switch controller is further configured to provide the control signals based on the input voltage sensed by the voltage feedforward controller.

In one embodiment, the converter further comprises a current feedforward controller configured to sense an output current from the output stage, wherein, the switch controller is further configured to provide the control signals based on the output current sensed by the current feedforward controller.

In one embodiment, the converter further comprises: a voltage feedforward controller configured to sense an input voltage to the full-bridge switching stage; a current feedforward controller configured to sense an output current from the output stage; wherein, the switch controller is further configured to provide the control signals based on the output current sensed by the current feedforward controller and the input voltage sensed by the voltage feedforward controller.

In one embodiment, the isolated charge sensor comprises an additional sensing winding of a resonant inductor of the plurality of inductors with the sensing winding connected to a double integrator circuit input terminals to produce the resonant inductor current charge signal as a voltage at its output terminals.

In one embodiment, the double integrator circuit comprises passive electrical elements.

In one embodiment, the double integrator circuit comprises passive and active electrical elements.

In one embodiment, the converter further comprises a voltage feedforward controller configured to sense an input voltage to the full-bridge switching stage, wherein, the switch controller is further configured to provide the control signals based on the input voltage sensed by the voltage feedforward controller.

In one embodiment, the converter further comprises a current feedforward controller configured to sense an output current from the output stage, wherein, the switch controller is further configured to provide the control signals based on the output current sensed by the current feedforward controller.

In one embodiment, the converter further comprises: a voltage feedforward controller configured to sense an input voltage to the full-bridge switching stage; a current feedforward controller configured to sense an output current from the output stage; wherein, the switch controller is further configured to provide the control signals based on the output current sensed by the current feedforward controller and the input voltage sensed by the voltage feedforward controller.

In one embodiment, the isolated charge sensor is electrically equivalent to a second transformer with first and second terminal pairs, the first terminal pair connected in series with the at least one of the plurality of inductors, and the second terminal pair connected to an integrator circuit to produce the resonant inductor current charge signal as a voltage.

In one embodiment, the integrator circuit comprises a capacitor.

In one embodiment, the converter further comprises a voltage feedforward controller configured to sense an input voltage to the full-bridge switching stage, wherein, the switch controller is further configured to provide the control signals based on the input voltage sensed by the voltage feedforward controller.

In one embodiment, the converter further comprises a current feedforward controller configured to sense an output current from the output stage, wherein, the switch controller is further configured to provide the control signals based on the output current sensed by the current feedforward controller.

In one embodiment, the converter further comprises: a voltage feedforward controller configured to sense an input voltage to the full-bridge switching stage; a current feedforward controller configured to sense an output current from the output stage; wherein, the switch controller is further configured to provide the control signals based on the output current sensed by the current feedforward controller and the input voltage sensed by the voltage feedforward controller.

In one embodiment, the plurality of capacitors comprises a first capacitor and a second capacitor, and the isolated charge sensor is electrically equivalent to a second transformer with first and second terminal pairs, the first terminal pair connected in parallel with the first capacitor and the second terminal pair connected to a resistor to produce the resonant inductor current charge signal as a voltage.

In one embodiment, the converter further comprises a voltage feedforward controller configured to sense an input voltage to the full-bridge switching stage, wherein, the switch controller is further configured to provide the control signals based on the input voltage sensed by the voltage feedforward controller.

In one embodiment, the converter further comprises a current feedforward controller configured to sense an output current from the output stage, wherein, the switch controller is further configured to provide the control signals based on the output current sensed by the current feedforward controller.

In one embodiment, the converter further comprises: a voltage feedforward controller configured to sense an input voltage to the full-bridge switching stage; a current feedforward controller configured to sense an output current from the output stage; wherein, the switch controller is further configured to provide the control signals based on the output current sensed by the current feedforward controller and the input voltage sensed by the voltage feedforward controller.

In one embodiment, the plurality of inductors of the resonant network includes at least one of a magnetizing inductance and a leakage inductance of the transformer.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

In this disclosure, a new control method to improve transient response to both load ($I_{OUT}$) and input ($V_{IN}$) disturbances and to reduce a low-frequency output voltage ripple of a resonant converter is provided. Previous publications mostly considered the application of charge control to half-bridge LLC. Ref. [18] considered charge-control for a full-bridge LLC converter. The inventors recognized and appreciated the need for a cost-effective implementation of charge control in full-bridge LLC converters.

Figure 1:
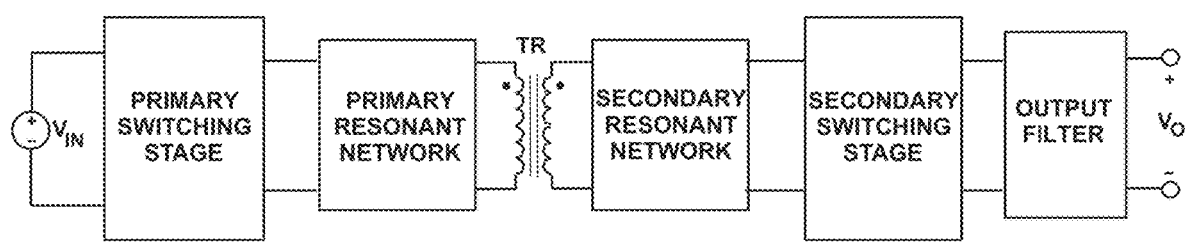
FIG. 1 is a block diagram of a resonant isolated DC-DC converter.
Figure 2:
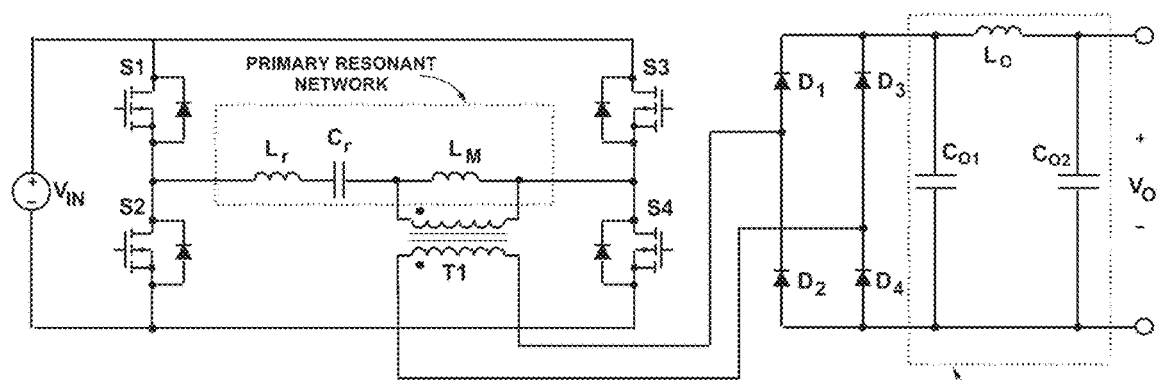
FIG. 2 is a circuit diagram of a conventional LLC resonant DC-DC converter. The converter in FIG. 2 has a full-bridge switching stage on the primary side, a full-bridge rectifier on the secondary side, and a CLC output filter.
Figure 3:
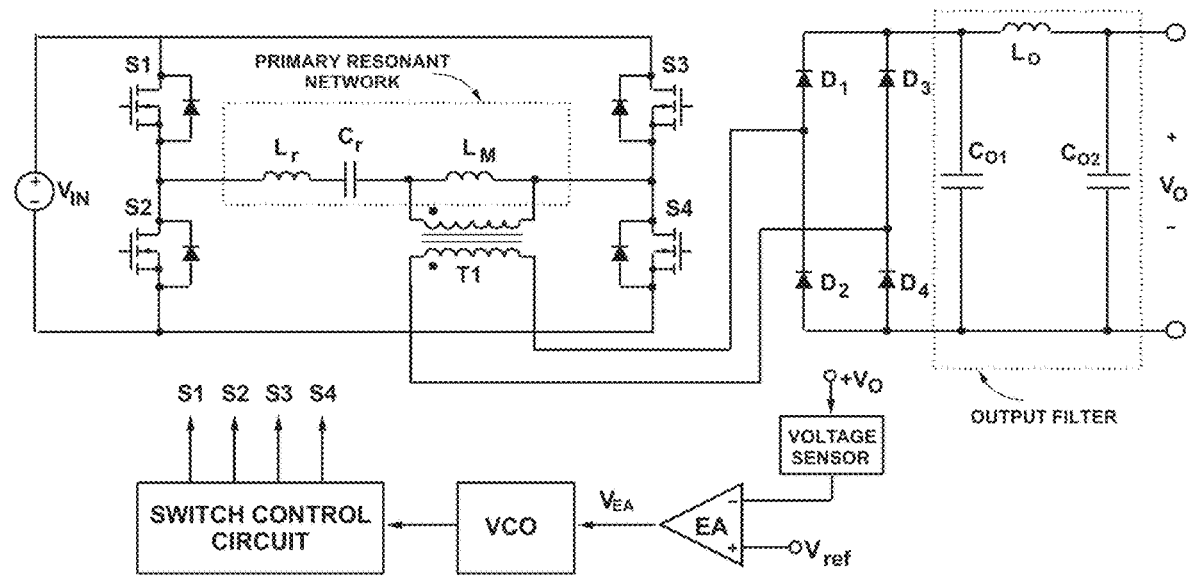
FIG. 3 is a block diagram of a full-bridge LLC resonant DC-DC converter with direct frequency control.
Figure 4:
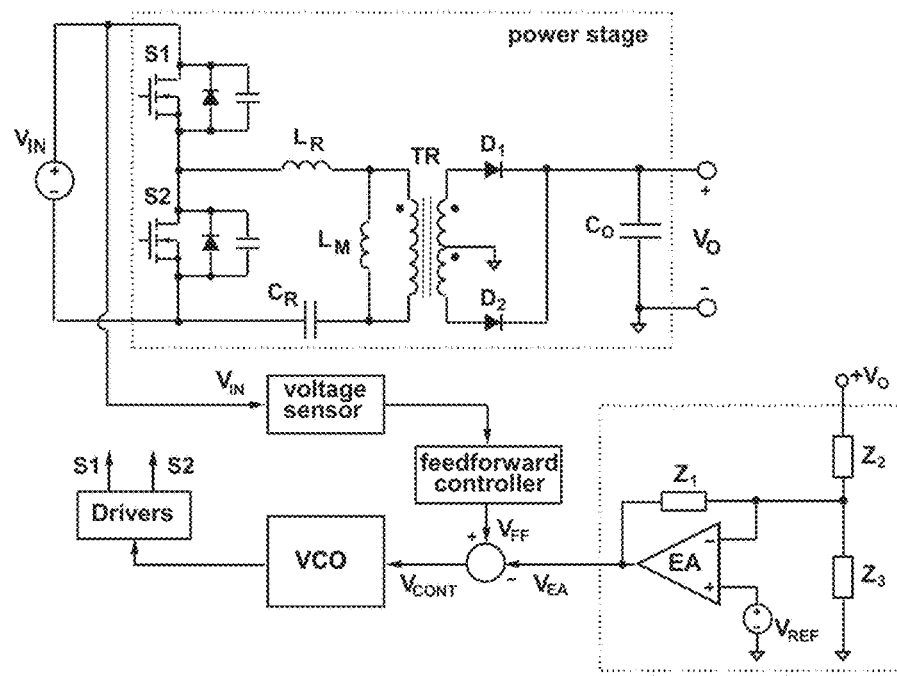
FIG. 4 is a block diagram of a half-bridge LLC resonant DC-DC converter with direct frequency control and input voltage feedforward control.
Figure 5:
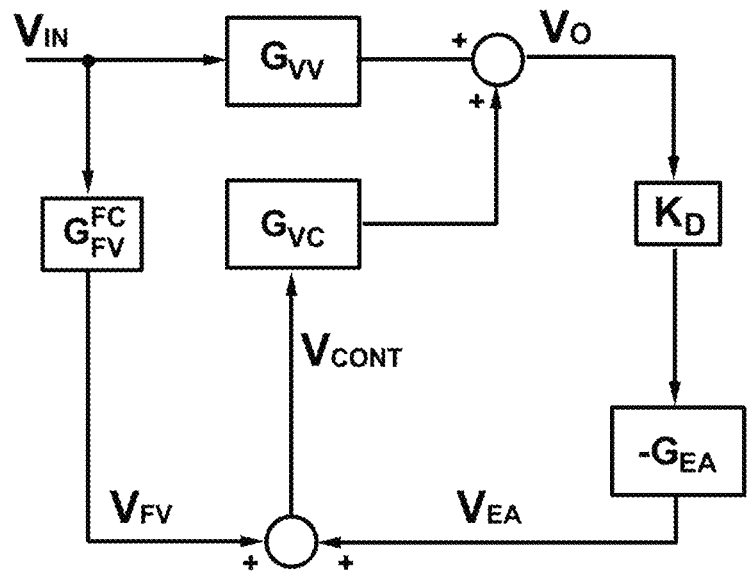
FIG. 5 is a small-signal block diagram of an LLC resonant converter with direct frequency control and input voltage feedforward control.
Figure 6:
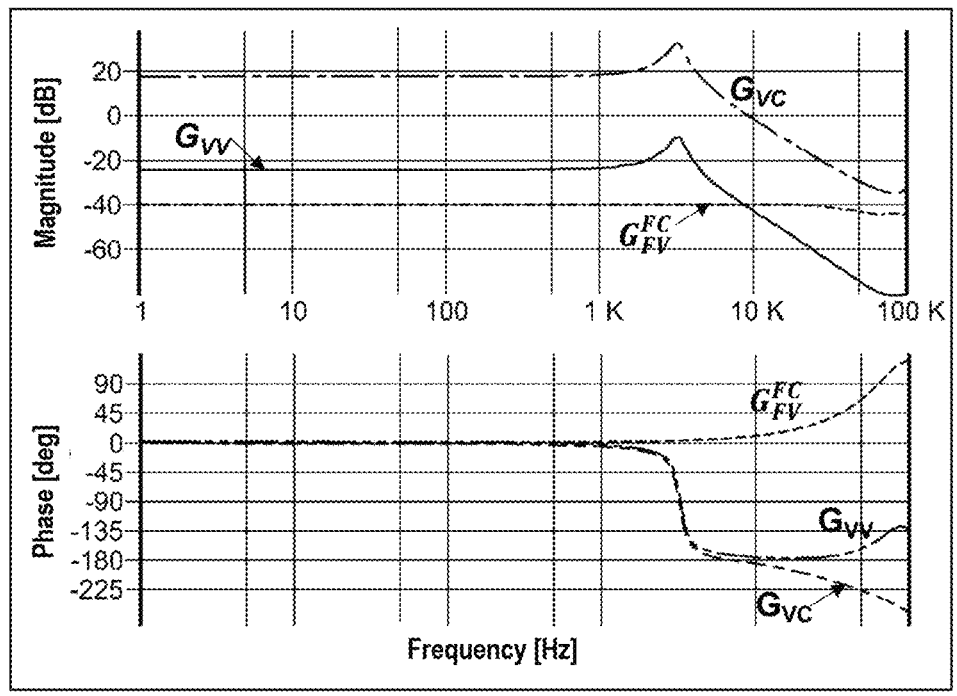
FIG. 6 shows Bode plots of control-to-output transfer function $G_{VC}$, open-loop audio-susceptibility transfer function $G_{VV}$, and transfer function $G_{FV}^{FC}$ of the ideal input voltage feedforward control for the LLC converter with direct frequency control.
Figure 7:
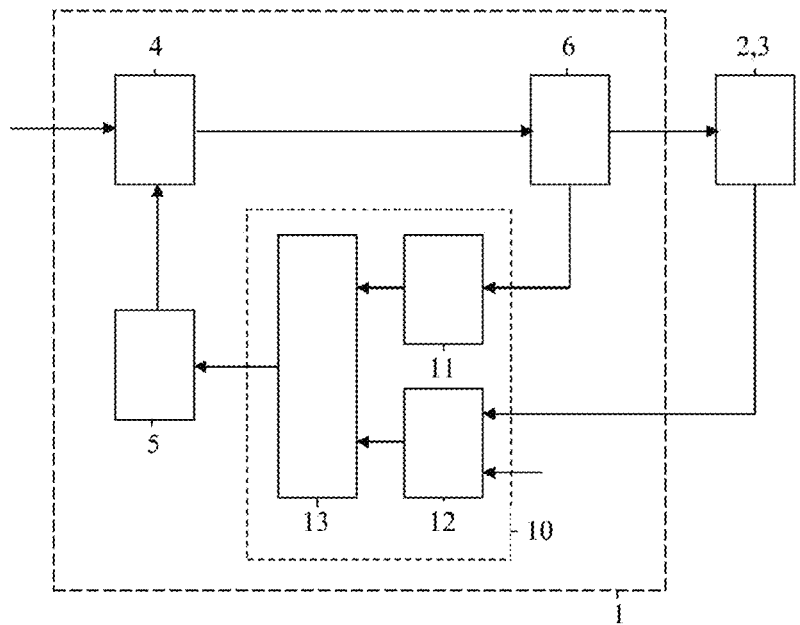
FIG. 7 is a block diagram of a resonant zero-voltage-switching DC-DC converter with two-loop control.
Figure 8:
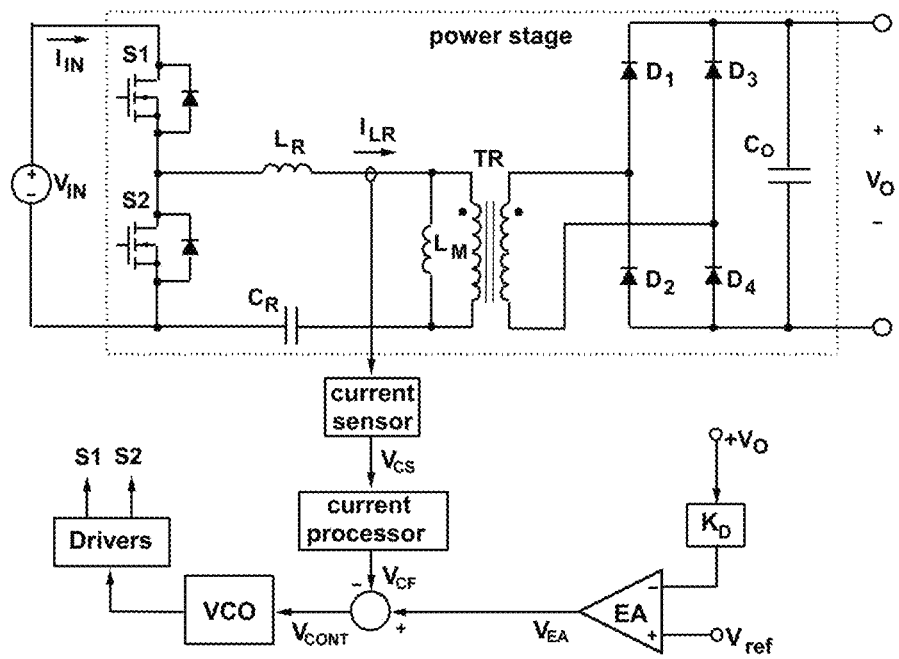
FIG. 8 is a block diagram of a conventional half-bridge LLC resonant DC/DC converter with the average-current-mode control.
Figure 9:
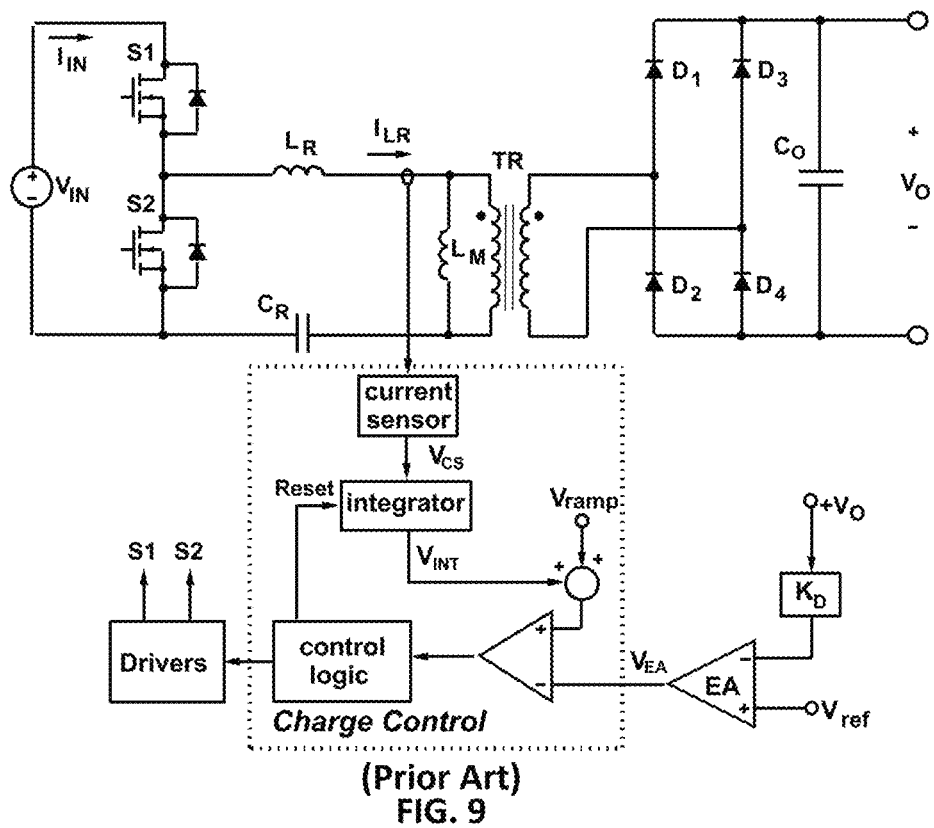
FIG. 9 is a block diagram of a conventional half-bridge LLC resonant DC/DC converter with the CC1 implementation.
Figure 10:
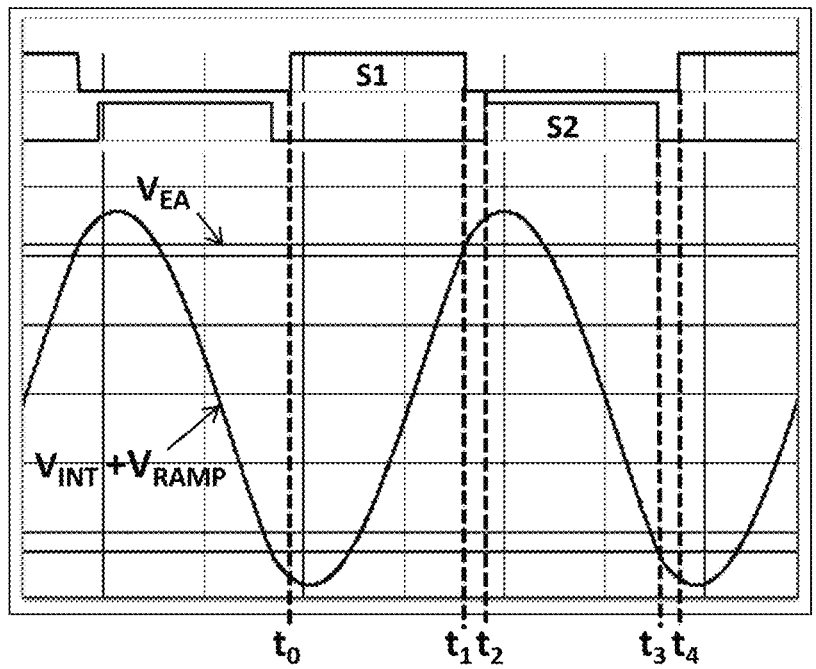
FIG. 10 shows key control waveforms of a conventional half-bridge LLC resonant DC/DC converter with the CC1 implementation.
Figure 11:
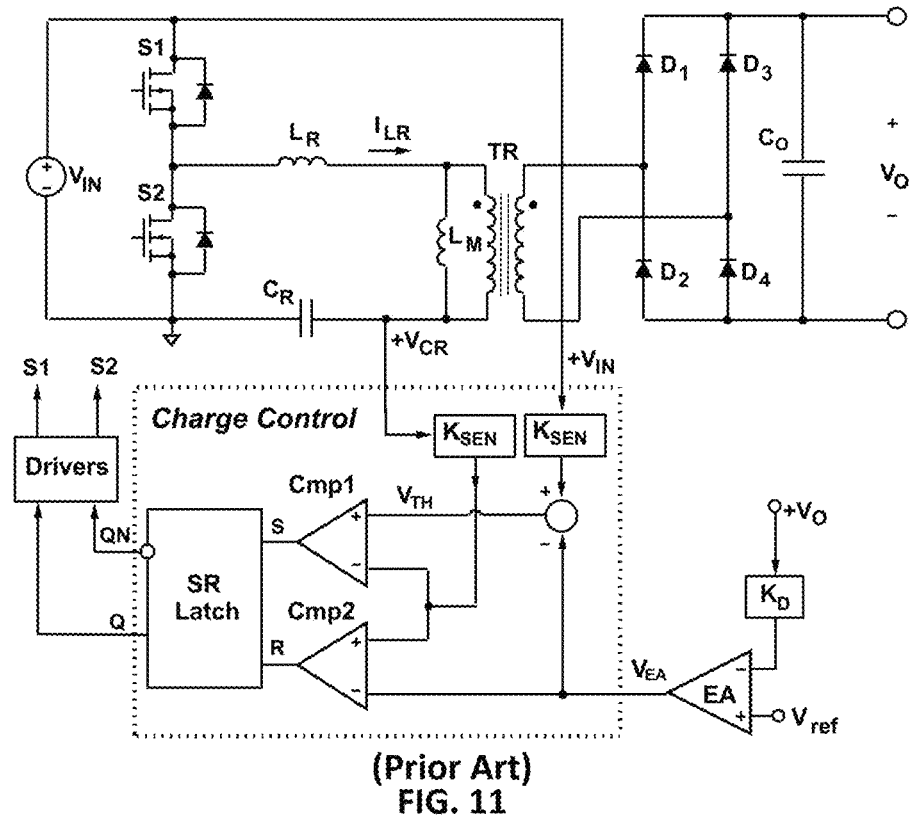
FIG. 11 is a block diagram of a conventional half-bridge LLC resonant DC/DC converter with the CC2 implementation.
Figure 12:
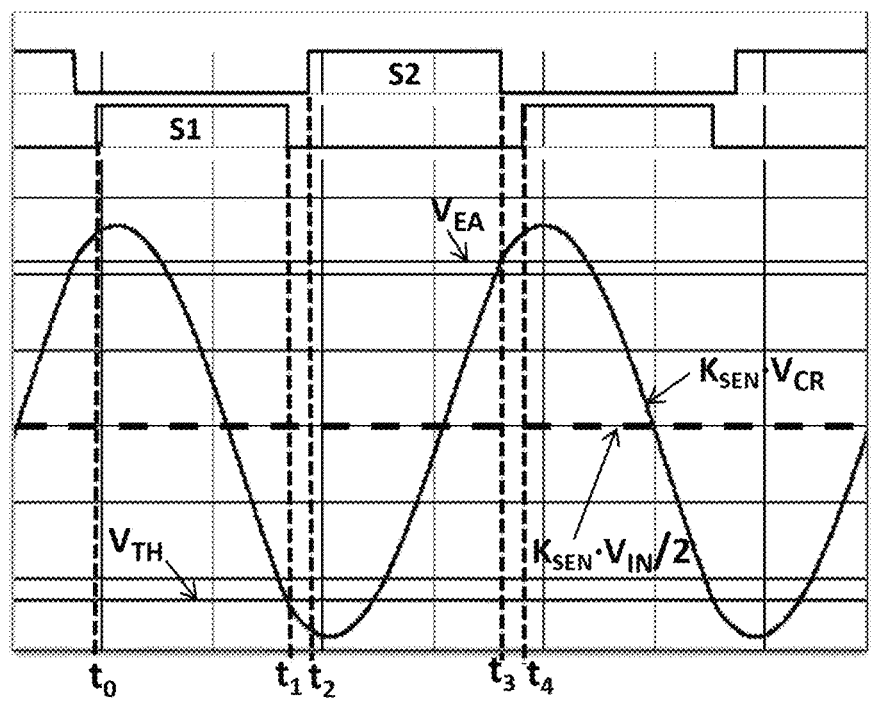
FIG. 12 shows key control waveforms of a conventional half-bridge LLC resonant DC/DC converter with the CC2 implementation.
Figure 13:
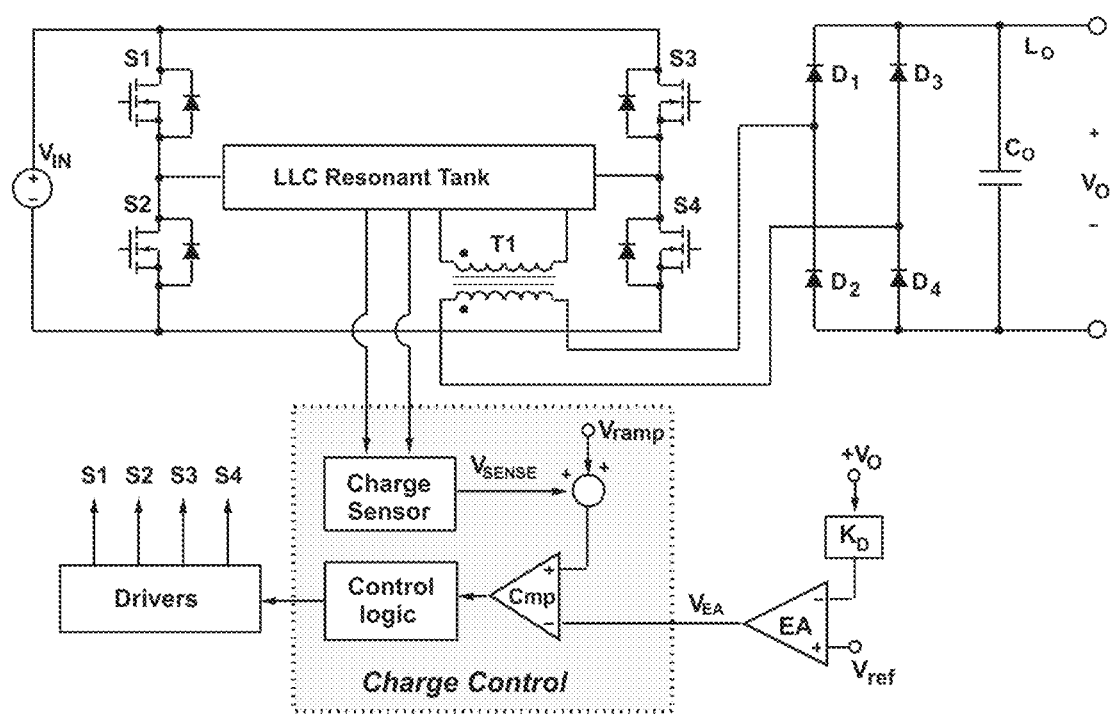
FIG. 13 shows a combined block diagram of a full-bridge LLC resonant converter with charge control in accordance with an embodiment of the present disclosure.

One aspect of the present disclosure is the implementation of charge control in a full-bridge LLC converter as shown in FIG. 13. When implementation of the charge control in the full-bridge LLC converter is selected, there are several important practical considerations:

1. The full-bridge LLC topology is typically used for DC-DC converters whose output power is in the multi-kW range.
2. These high-power DC-DC converters typically employ digital control and are required to have multiple communication channels with the centralized power system controller. This communication is much simpler and cost-effective when the digital signal processor (DSP) is located on the transformer secondary side. In this case, communication signals have the same ground as the system controller and no isolation devices for communication channels are necessary.
3. With the DSP located on the secondary side, there is no need to transfer output voltage or current feedback signals over the isolation boundary. Today's analog signal isolation devices have either poor speed at low cost or adequate speed, but at high cost.

Taking these practical considerations into account, it is highly desirable to use an isolated charge sensor which can deliver the sensed signal directly to the secondary-side controller. There are several approaches which could potentially meet this requirement at low cost. In one embodiment (the first approach) the signal is sensed at the terminals of an additional sensing winding of the resonant inductor. In another embodiment (the second approach) the resonant inductor current is sensed with a current transformer. In yet another embodiment (the third approach) the resonant capacitor voltage is sensed with a voltage transformer. These three approaches are described below in detail.

Figure 14A:
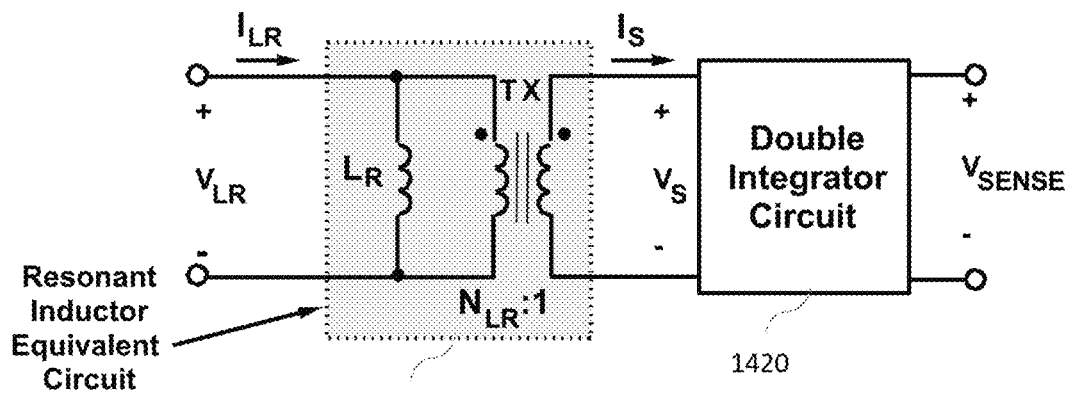
FIG. 14A shows a circuit diagram of a charge sensor based on the sensing winding of resonant inductor in accordance with an embodiment of the present disclosure.

An implementation of the first approach is shown in FIG. 14A. The simplified equivalent circuit of the resonant inductor with sensing winding is shown inside rectangle 1410 in FIG. 14A and includes inductance $L_R$ and ideal transformer TX. The resonant inductor power winding is located on the left side of the drawing, whereas the sensing winding is located on the right side of the drawing. Ideal transformer TX with turns ratio $N_{LR}$:1, where $N_{LR}$ is the number of power winding turns. The sensing winding typically has one turn, but generally can have any number of turns.

Since voltage $V_{LR}$ across the resonant inductor power winding is related to current $I_{LR}$ as $V_{LR}=L_R dI_{LR}/dt$, voltage $V_S$ across the sensing winding is proportional to the second derivative of charge Q. To obtain sensor output voltage $V_{SENSE}$, proportional to charge Q, a double integrator circuit 1420, shown in FIG. 14A, is required.

Figure 14B:
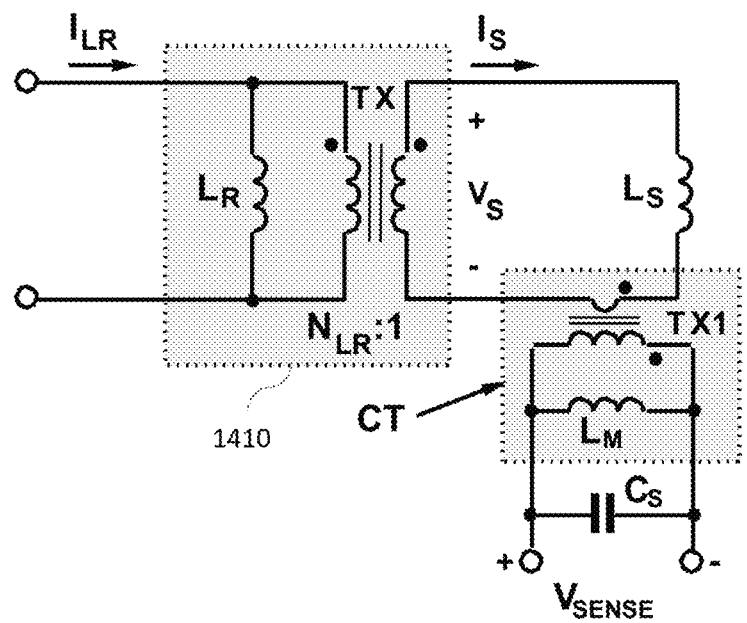
FIG. 14B shows a charge sensor based on the sensing winding of resonant inductor in accordance with a passive embodiment of the present disclosure.

Double integrator 1420 can be implemented with a passive or an active circuit. One embodiment of a passive double integrator implementation is shown in FIG. 14B. The sensing winding in FIG. 14B is terminated with inductor $L_S$. Due to the symmetry of the power and sensing sides of the resonant inductor, sensing winding current $I_S$ is proportional to current $I_{LR}$. This current is sensed with a current transformer CT, whose equivalent circuit in FIG. 14B is represented by ideal transformer TX1 and magnetizing inductance $L_{MS}$. The CT secondary current, which is proportional to current $I_S$, flows through integrating capacitor $C_S$. Therefore, sensor output voltage $V_{SENSE}$ is proportional to charge Q.

Figure 14C:
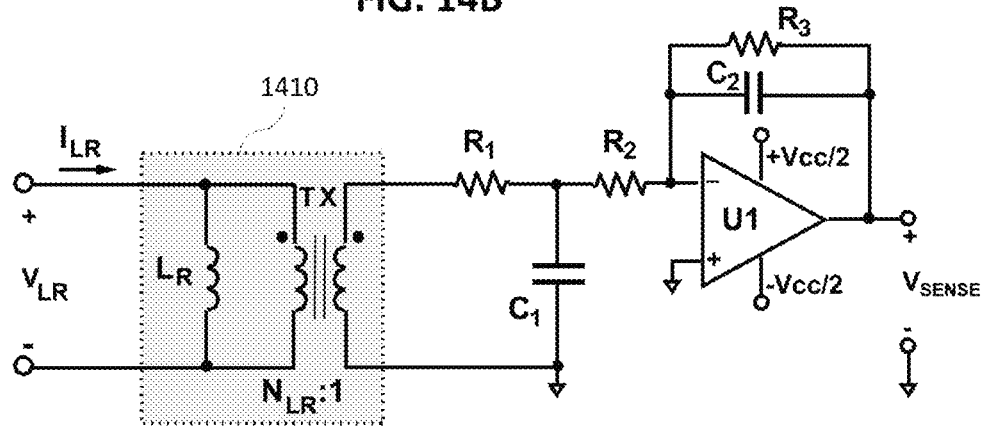
FIG. 14C shows a charge sensor based on the sensing winding of resonant inductor in accordance with an active embodiment of the present disclosure.

One exemplary embodiment of an active double integrator implementation is shown in FIG. 14C. The first integration stage is implemented by passive circuit $R_1$, $C_1$, whereas the second integration stage is implemented by the active circuit including operational amplifier U1, resistors $R_2$, $R_3$, and capacitor $C_2$.

Figure 15A:
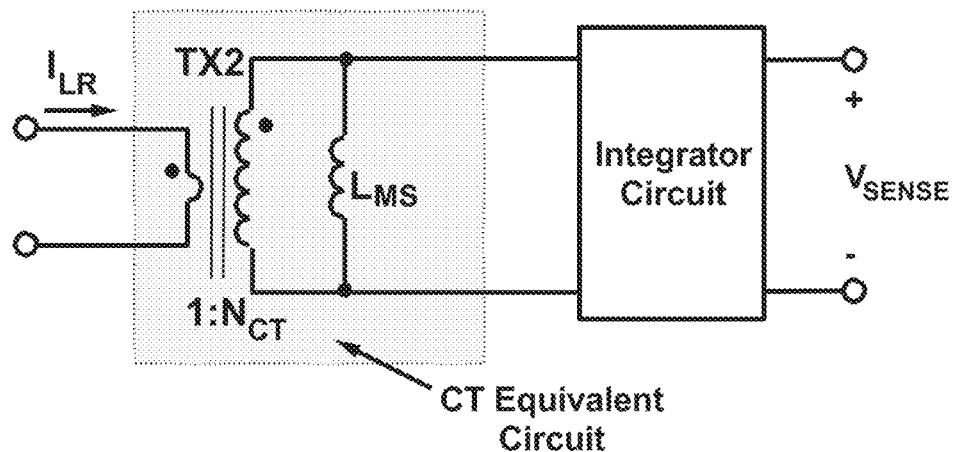
FIG. 15A shows a circuit diagram of a charge sensor based on sensing resonant inductor current $I_{LR}$, in accordance with an embodiment of the present disclosure.

The second implementation of the isolated charge sensor with the current transformer is shown in FIG. 15A. The current transformer (CT) can be used for sensing resonant current $I_{LR}$, because the resonant capacitor blocks the DC current flowing through the resonant inductor. CT senses resonant inductor current $I_{LR}$ and its equivalent circuit in FIG. 15A includes ideal transformer TX2 with turns ratio 1:$N_{CT}$ and secondary-side magnetizing inductance $L_{MS}$. The CT secondary winding provides the input signal for the integrator circuit in FIG. 15A.

Figure 15B:
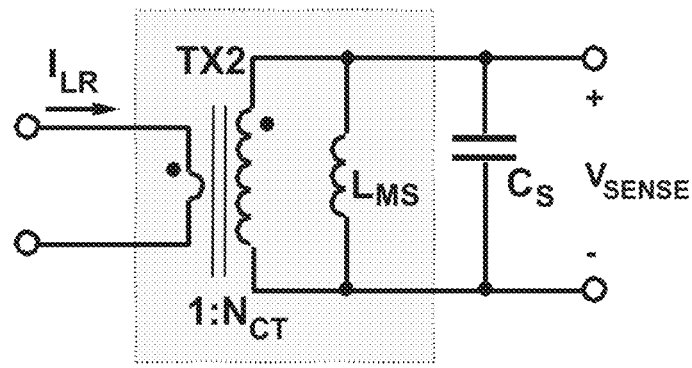
FIG. 15B shows a charge sensor based on sensing resonant inductor current $I_{LR}$, in accordance with a passive embodiment of the present disclosure.

In one embodiment of the second approach, the CT secondary winding is terminated with capacitor $C_S$, as shown in FIG. 15B. Current $I_{LR}$, reflected to the secondary side, splits between magnetizing inductance $L_{MS}$ and output capacitor $C_S$. The distribution of reflected current $I_{LR}/N_{CT}$ between magnetizing inductance $L_{MS}$ and capacitor $C_S$ depends on the switching frequency. Input/output relationship of the charge sensor in FIG. 15B is described by transfer function $$V_{SENSE}/I_{LR} = 1/N_{CT} \cdot s \cdot L_{MS}/(1+s^2 \cdot L_{MS} \cdot C_S). \quad (3)$$

Equation (3) reveals that the sensor transfer function has a zero at zero frequency and double resonant poles at frequency $f_{RES}=1/(2\pi \cdot \sqrt{L_{MS} \cdot C_S})$. When converter switching frequency is much higher than resonant frequency $f_{RES}$, transfer function (3) is simplified to $$V_{SENSE}/I_{LR} = 1/N_{CT} \cdot 1/(s \cdot C_S). \quad (4)$$

Equation (4) demonstrates that at high frequencies the sensor integrates current $I_{LR}$ and, therefore, sensor output voltage $V_{SENSE}$ is proportional to charge Q. Component values $L_{MS}$ and $C_S$ are selected to keep resonant frequency $f_{RES}$ well below converter minimum operating frequency.

Figure 16:
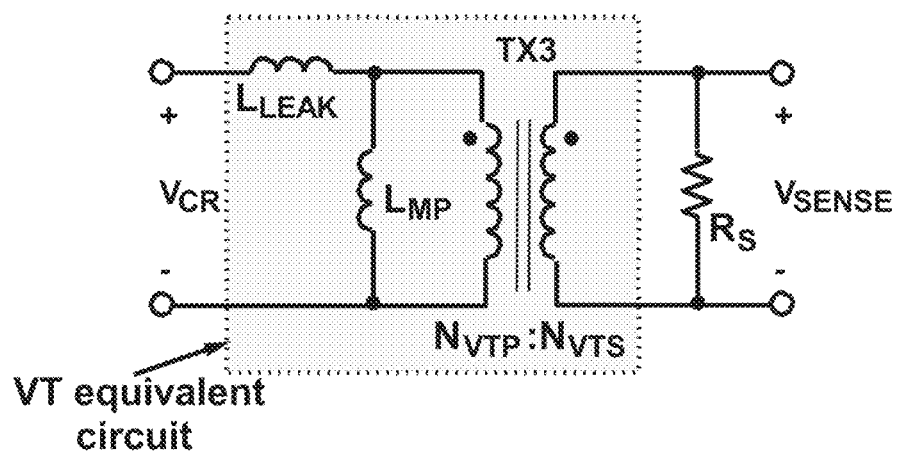
FIG. 16 shows a circuit diagram of a charge sensor based on sensing resonant capacitor voltage $V_{CR}$ with a voltage transformer in accordance with an embodiment of the present disclosure.

The third approach for the charge control of the full-bridge LLC converter is based on sensing of the resonant capacitor voltage with the voltage transformer (VT). The simplified equivalent circuit of the voltage transformer sensor is shown in FIG. 16, where TX3 is an ideal transformer with turns ratio $N_{VT}=N_{VTP}/N_{VTS}$, $L_{MP}$ and $L_{LEAK}$ are the primary-side magnetizing and leakage inductances, and $R_S$ is the output resistor of the sensor. As can be seen in FIG. 16, voltage $V_{CR}$ is divided between leakage inductance $L_{LEAK}$ and parallel combination of magnetizing inductance $L_{MP}$ and reflected resistance $R_S \cdot N_{VT}^2$. Input/output relationship of the voltage sensor in FIG. 16 is described by transfer function $$V_S/V_{CR} = 1/N_{VT} \cdot 1/[1+L_{LEAK}/L_M+s L_{LEAK}/(R_S \cdot N_{VT}^2)]. \quad (5)$$

Equation (5) reveals that VT sensor transfer function has a single pole at frequency $f_{PV}=2\pi/(L_{LEAK}/(R_S \cdot N_{VT}^2))$ and no zeroes. For typical transformer, $L_{LEAK} \ll L_{MP}$ and transfer function (5) is simplified to $$V_{SENSE}/V_{CR} \cong 1/N_{VT} \cdot 1/[1+s \cdot L_{LEAK}/(R_S \cdot N_{VT}^2)]. \quad (6)$$

Figure 17:
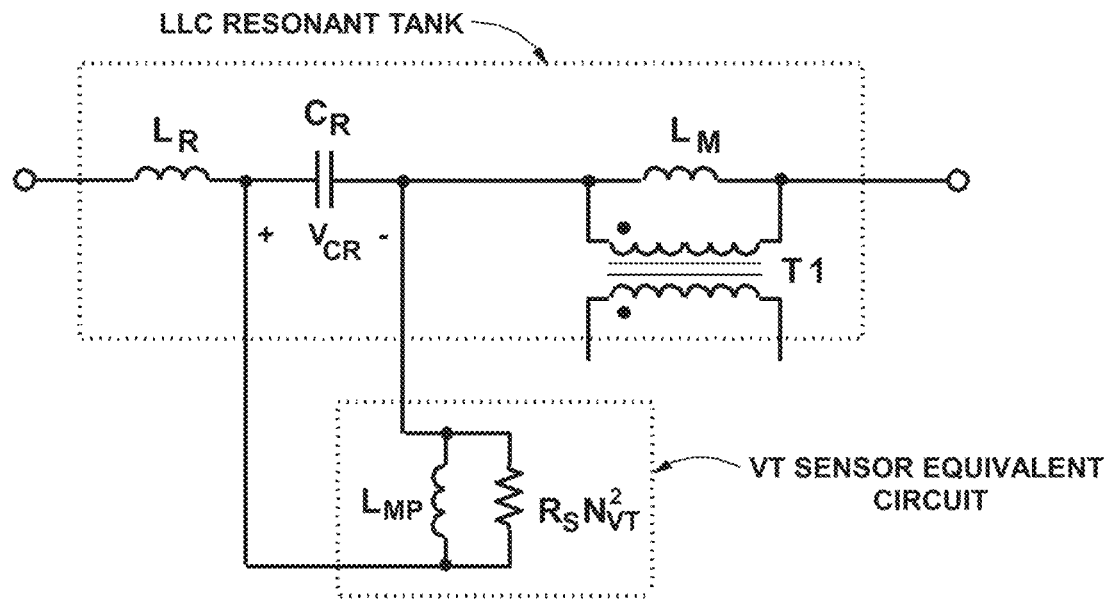
FIG. 17 shows a combined circuit diagram of a conventional LLC converter resonant tank and an equivalent circuit diagram of the voltage-transformer-based charge sensor in accordance with an embodiment of the present disclosure.
Figure 18:
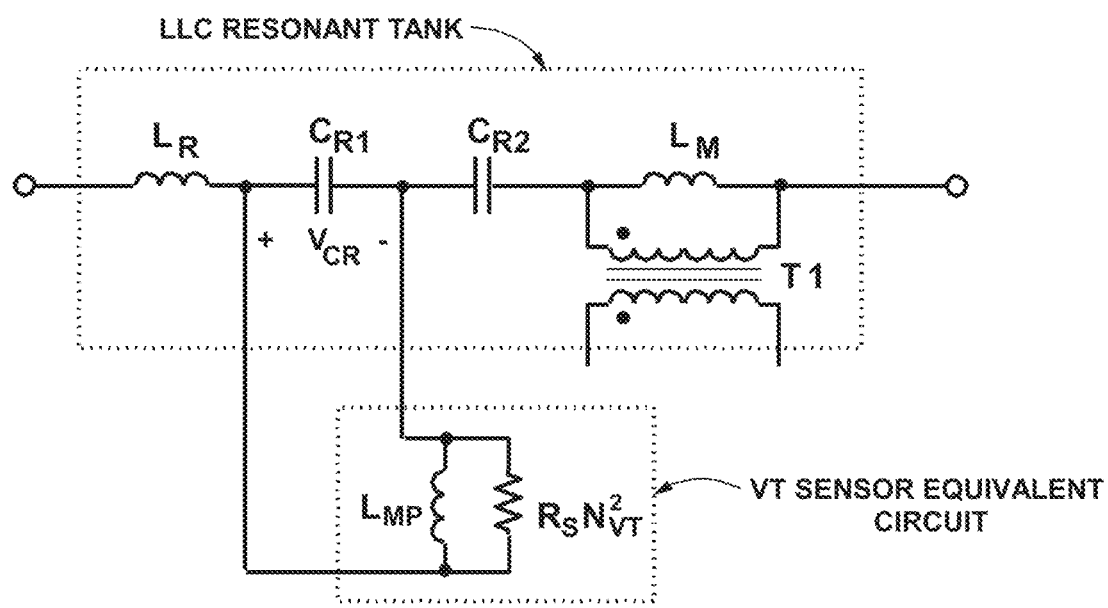
FIG. 18 shows a combined circuit diagram of an LLC converter resonant tank and an equivalent circuit diagram of the voltage-transformer-based charge sensor in accordance with an embodiment of the present disclosure.
Figure 19:
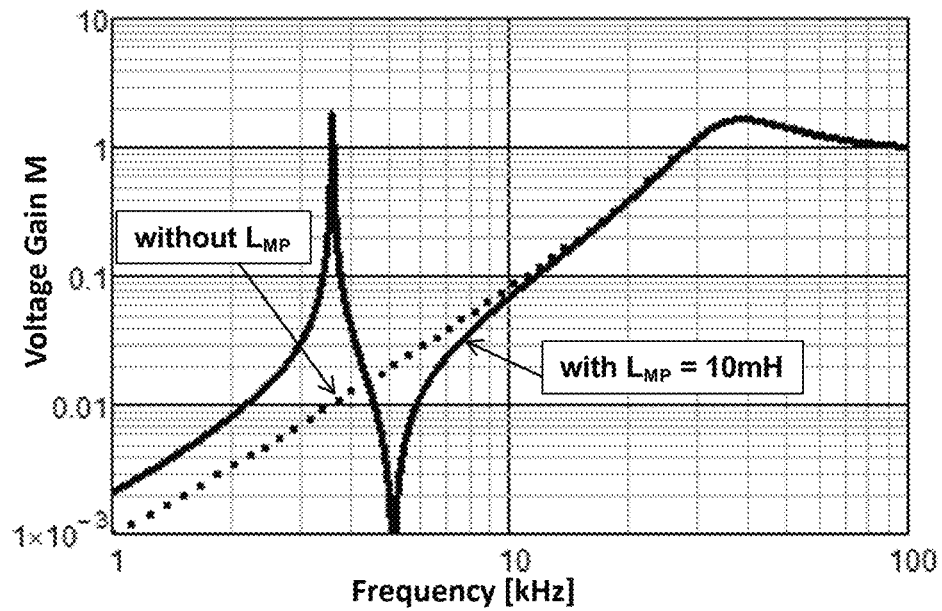
FIG. 19 shows an exemplary plot of LLC converter voltage gain M versus frequency with and without the voltage-transformer-based charge sensor in accordance with an embodiment of the present disclosure.

When voltage $V_{CR}$ is sensed with the voltage transformer, it is important to minimize the VT effect on the resonant tank operation. FIG. 17 shows combined circuit diagram of the LLC resonant tank and equivalent circuit diagram of the VT sensor with resistor $R_S$ reflected to the primary side and inductance $L_{LEAK}$ neglected. There are two ways of the VT detrimental interaction with the resonant tank. First, VT primary winding creates the DC current path which bypasses capacitor $C_R$ and, therefore, can lead to saturation of transformer T1 and VT itself. To eliminate the DC current path, resonant capacitor $C_R$ is split into two series-connected capacitors $C_{R1}$ and $C_{R2}$, as shown in FIG. 18. The capacitance value of resonant capacitor $C_R$ and the capacitance value of series-connected capacitors $C_{R1}$ and $C_{R2}$ should be the same. Second, VT magnetizing inductance $L_{MP}$ becomes an extra resonant component of the resonant tank which affects converter voltage gain $M=N \cdot V_O/V_{IN}$. This effect can be observed in FIG. 19, which shows calculated gain M with and without inductance $L_{MP}$. Inductance $L_{MP}$ introduces extra pole at frequency $f_P \approx 1/(2\pi \cdot \sqrt{2 \cdot L_{MP} \cdot C_{R1}})$ and zero at frequency $f_Z \approx 1/(2\pi \cdot \sqrt{L_{MP} \cdot C_{R1}})$. To minimize the effect of these pole and zero, their frequencies should be well below the converter operating range. It is sufficient to select inductance $L_{MP}$ high enough to make frequencies of extra pole and zero significantly lower than resonant frequency $f_{RM}=1/(2\pi \cdot \sqrt{(L_M+L_R) \cdot C_R})$, where $C_R = C_{R1} \cdot C_{R2}/(C_{R1}+C_{R2})$. This condition is met in FIG. 19, where $f_P$=3.5 kHz, $f_Z$=5.0 kHz and $f_{RM}$=34 kHz. FIG. 19 also shows that, at frequencies above 15-20 kHz, magnetizing inductance $L_{MP}$ practically has no effect on the converter voltage gain M.

With the disclosed sensing approaches, both CC1 and CC2 implementations in the full-bridge LLC converter are possible. For CC2 implementation in the full-bridge converter, sensing of the input voltage is not required.

Figure 20:
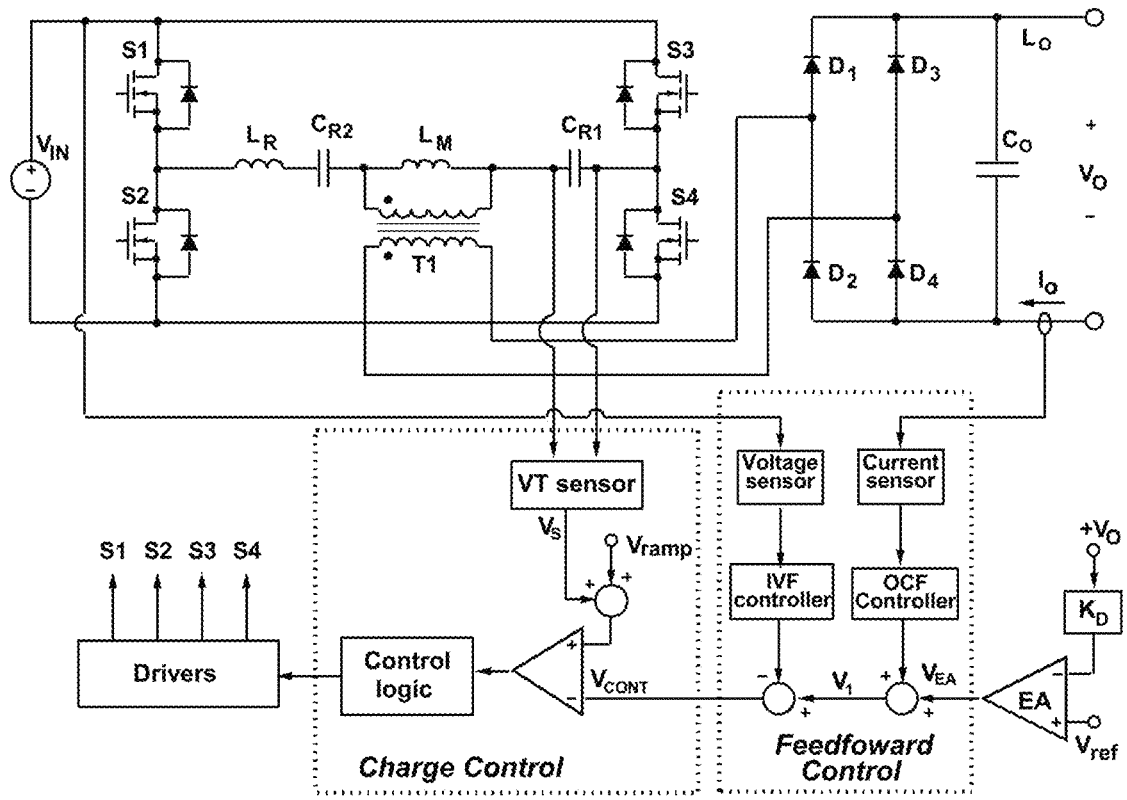
FIG. 20 shows a block diagram of the charge control combined with the output current feedforward control and the input voltage feedforward control in accordance with an embodiment of the present disclosure.

Another aspect of the present disclosure is the improvement of the LLC converter response to disturbances of the output current and input voltage. The improvement is achieved by combining the charge control with the feedforward output current control and the feedforward input voltage control. The corresponding control block diagram is shown in FIG. 20. To implement output current feedforward (OCF) control, output current $I_O$ in FIG. 20 is sensed and processed by OCF controller, whose output signal is summed with error amplifier output signal $V_{EA}$. To implement input voltage feedforward (IVF) control, input voltage $V_{IN}$ is sensed and processed by IVF controller, whose output signal is subtracted from signal $V_1$, as shown in FIG. 20.

Note that proposed feedforward control can have only input voltage feedforward control or only output current feedforward control or both of them. Usually, the charge control has much better input disturbance rejection than the direct frequency control (Refs. [19]-[20]), and, depending on converter specifications, the input voltage feedforward control may not be required. However, as was mentioned before, the charge control cannot significantly improve the load disturbance rejection with respect to DFC, and the output current feedforward control is highly desirable.

Figure 21:
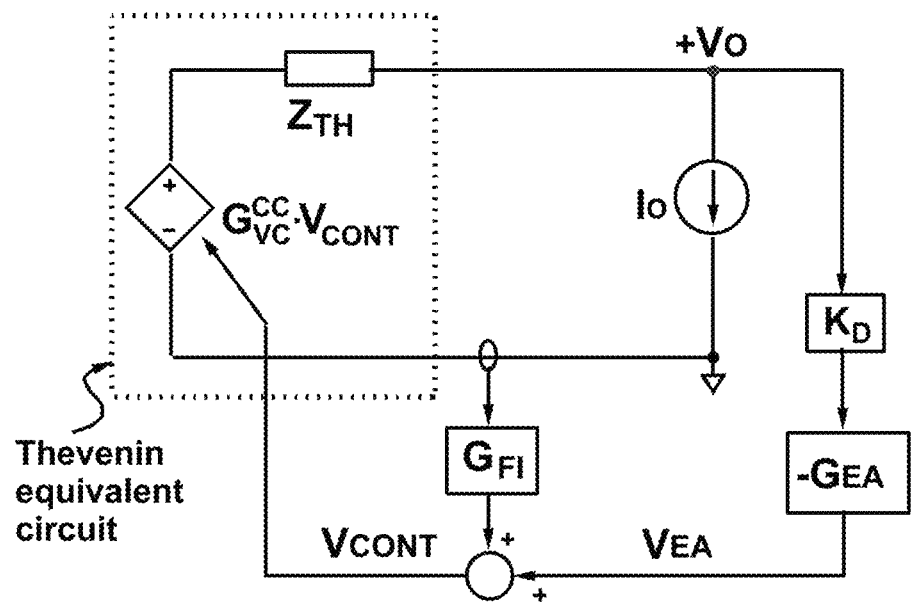
FIG. 21 shows a small-signal block diagram of the resonant converter with the charge control combined with the output current feedforward control in accordance with an embodiment of the present disclosure.

To determine ideal transfer function of the output current feedforward control, the small-signal block diagram of the disclosed control, shown in FIG. 21, is employed. For the converter with the charge control, its output port is represented in FIG. 21 with the Thevenin equivalent circuit, which includes Thevenin dependent voltage source $G_{VC}^{CC} \cdot V_{CONT}$ and Thevenin impedance $Z_{TH}$, where $G_{VC}^{CC} = V_O/V_{CONT}$ is the control-to-output transfer function of the charge control and $Z_{TH}$ is the converter output impedance with charge control loop closed, voltage feedback loop opened, and output current feedforward control loop opened.

In addition to the Thevenin equivalent circuit, the block diagram in FIG. 21 also includes:
1. Transfer function $K_D$ of the output voltage sensor;
2. Transfer function $G_{EA}$ of the error amplifier;
3. Combined transfer function $G_{FI}$ of output current sensor and OCF controller.

When output voltage feedback path and output current feedforward path are closed, converter small-signal closed-loop output impedance $Z_O^{CL}$ is derived from the block diagram in FIG. 21 as $$Z_O^{CL} = -\frac{V_O}{I_O} = \frac{Z_{TH} - G_{FI} \cdot G_{VC}^{CC}}{1 + T_V}, \quad (7)$$

where $T_V = K_D \cdot G_{EA} \cdot G_{VC}$ is the voltage feedback loop gain.

Equation (7) indicates that complete cancellation of the small-signal output current disturbance is possible when $$G_{FI} = Z_{TH}/G_{VC}^{CC}. \quad (8)$$

It should be noted that ideal small-signal feedforward control transfer function $G_{FI}$, defined by equation (8), cannot completely cancel the real-life input disturbance for two major reasons:
1. Both power stage and feedback frequency control are nonlinear blocks and their large-signal behavior cannot be adequately represented by small-signal transfer functions $Z_{TH}$ and $G_{VC}^{CC}$ which depend on converter operating point, namely, on the input voltage and the output current;
2. Since both $Z_{TH}$ and $G_{VC}^{CC}$ are frequency-dependent transfer functions, ideal transfer function $G_{FI}$ is also frequency dependent. The accurate implementation of its all poles and zeroes could be too complex for practical feedforward control.

Figure 22:
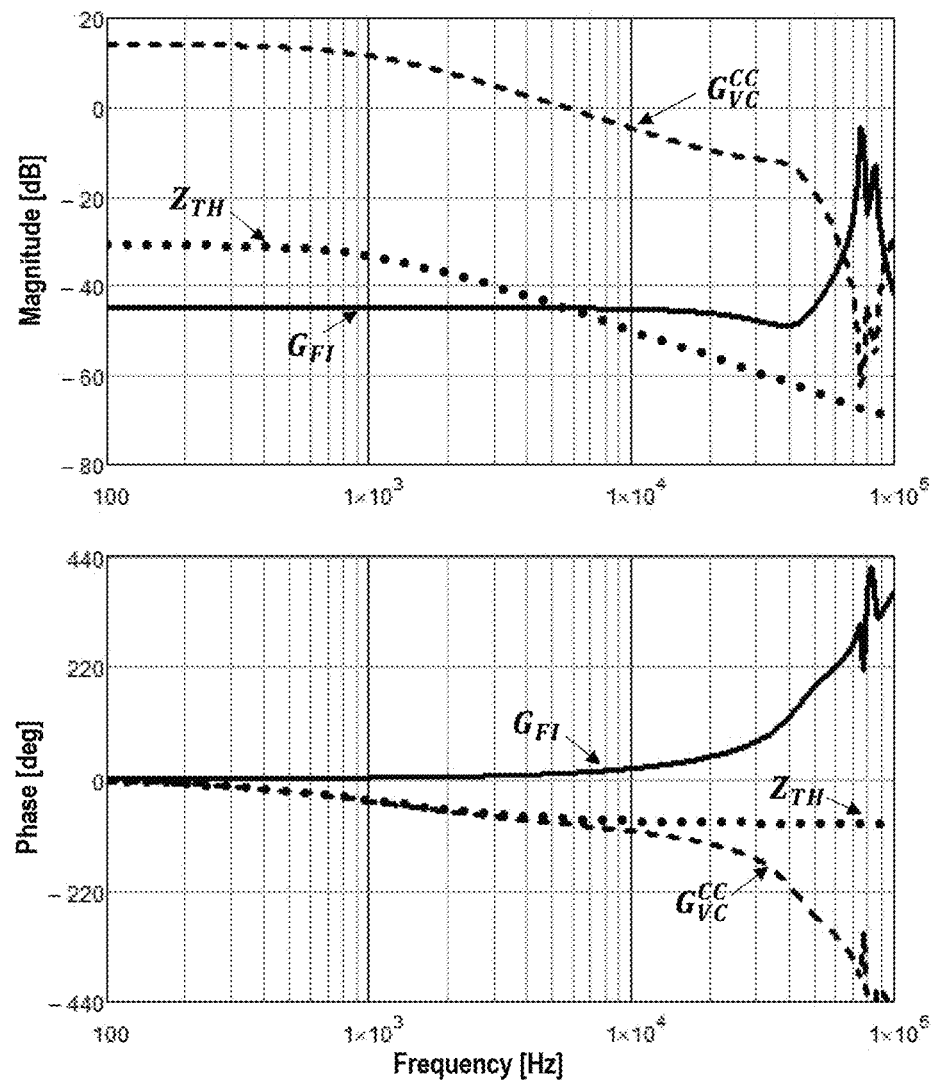
FIG. 22 shows exemplary Bode plots of transfer functions $Z_{TH}$, $G_{VC}^{CC}$, and $G_{FI}$ of a full-bridge LLC converter with the charge control and the output current feedforward control in accordance with an embodiment of the present disclosure.

As an example, the Bode plots of transfer functions $Z_{TH}$, $G_{VC}^{CC}$, and $G_{FI}$ of the full-bridge LLC converter with the charge control are shown in FIG. 22.

Figure 23:
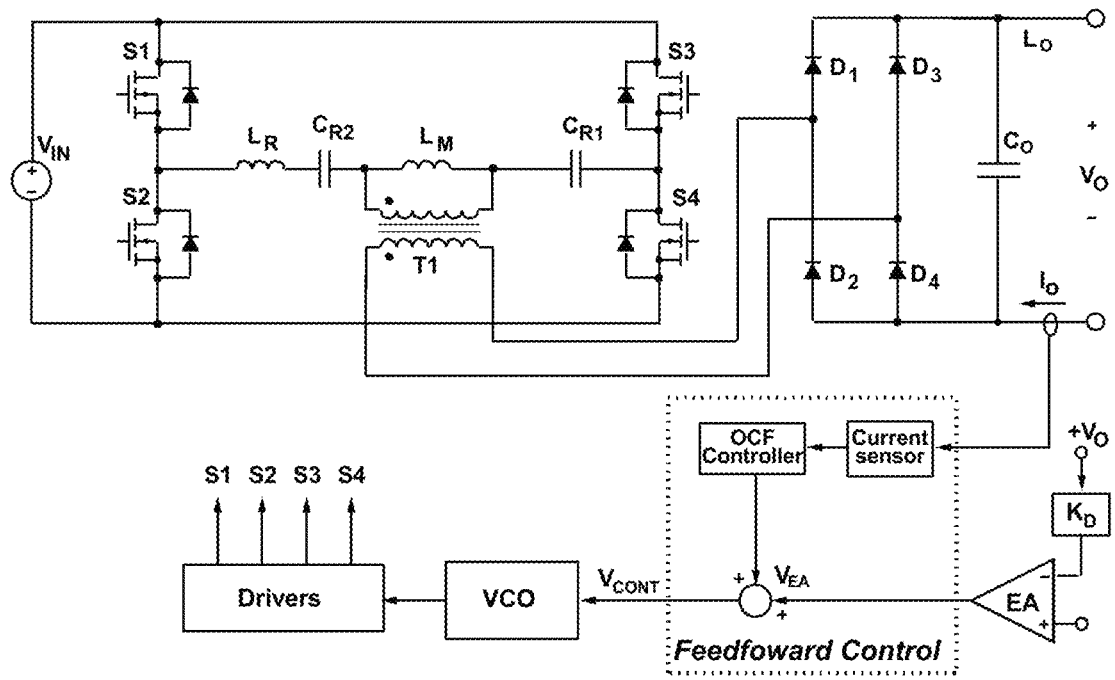
FIG. 23 shows a block diagram of the direct frequency control combined with the output current feedforward control in accordance with an embodiment of the present disclosure.
Figure 24:
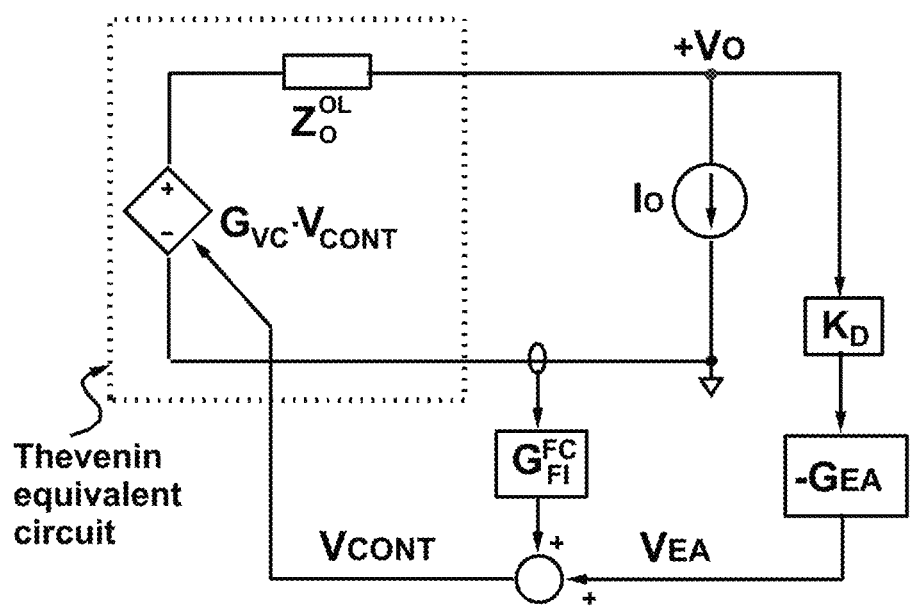
FIG. 24 shows a small-signal block diagram of a resonant converter with the direct frequency control combined with the output current feedforward control in accordance with an embodiment of the present disclosure.

The output current feedforward control can be applied also to resonant converters with the direct frequency control. The exemplary implementation of the OCF control in the full-bridge LLC converter with the DFC is shown in FIG. 23, whereas its corresponding control block diagram is shown in FIG. 24. As for the charge control, the converter output port is represented in FIG. 24 with the Thevenin equivalent circuit, which includes Thevenin dependent voltage source $G_{VC} \cdot V_{CONT}$ and Thevenin impedance $Z_O^{OL}$, where $G_{VC}$ is the DFC control-to-output transfer function and $Z_O^{OL}$ is the converter output impedance with voltage feedback path opened and output current feedforward control path opened.

In addition to the Thevenin equivalent circuit, the block diagram in FIG. 24 also includes:
1. current source $I_O$ which represents the small-signal load current perturbation;
2. transfer function $K_D$ of the output voltage sensor;
3. Combined transfer function $G_{FI}^{FC}$ of the output current sensor and OCF controller.

When output voltage feedback path and output current feedforward path are closed, converter closed-loop output impedance $Z_O^{CL}$ is derived from the block diagram in FIG. 24 as $$Z_O^{CL} = -\frac{V_O}{I_O} = \frac{Z_O^{OL} - G_{FI}^{FC} \cdot G_{VC}}{1 + T_V}. \quad (9)$$

Equation (9) indicates that complete cancellation of the small-signal output current disturbance is possible when $$G_{FI}^{FC} = Z_O^{OL}/G_{VC}. \quad (10)$$

For the DFC, ideal small-signal feedforward control transfer function $G_{FI}^{FC}$, defined by equation (10), cannot completely cancel the real-life load disturbance for the same reasons mentioned above for transfer function $G_{FI}$, corresponding to the charge control.

Figure 25:
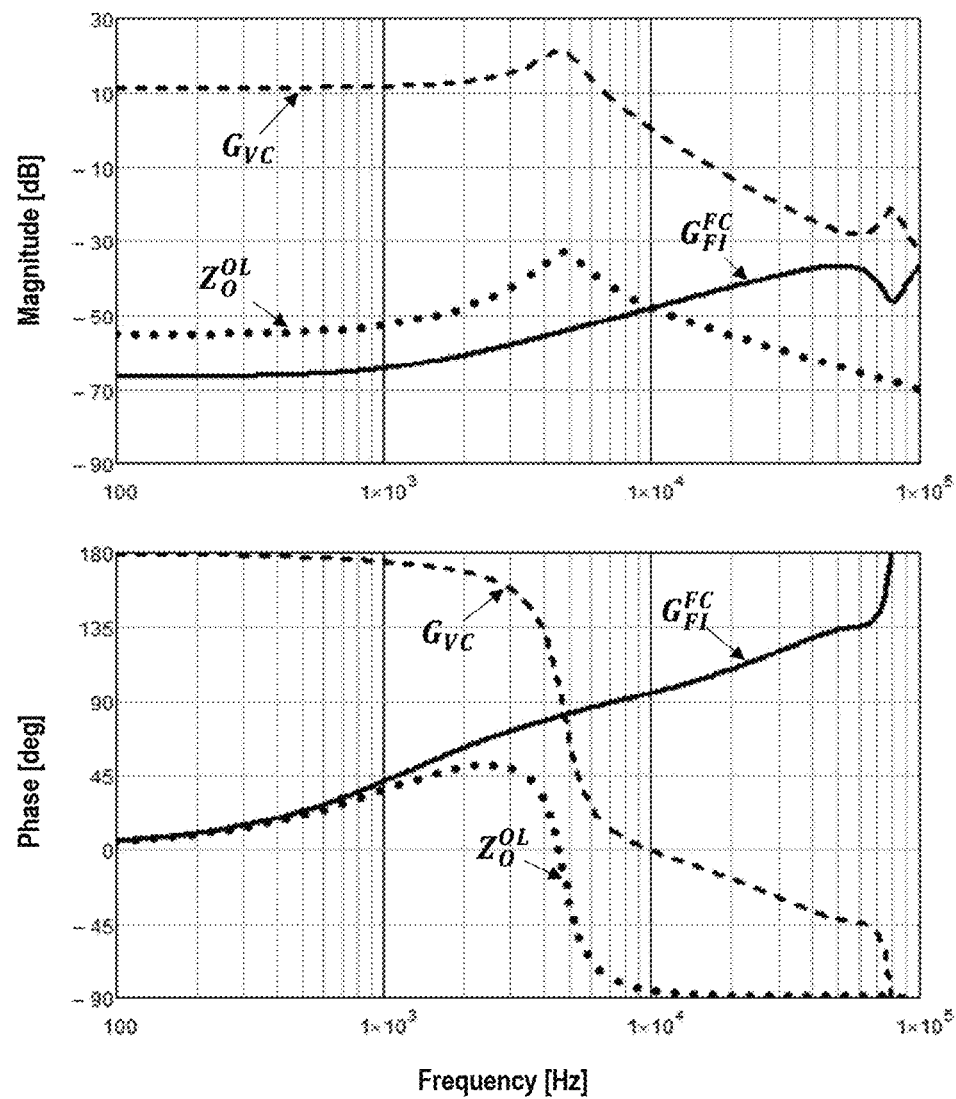
FIG. 25 shows exemplary Bode plots of transfer functions $Z_O^{OL}$, $G_{VC}$, and $G_{FI}^{FC}$ of a full-bridge LLC converter with the direct frequency control and the output current feedforward control in accordance with an embodiment of the present disclosure.
Figure 26:
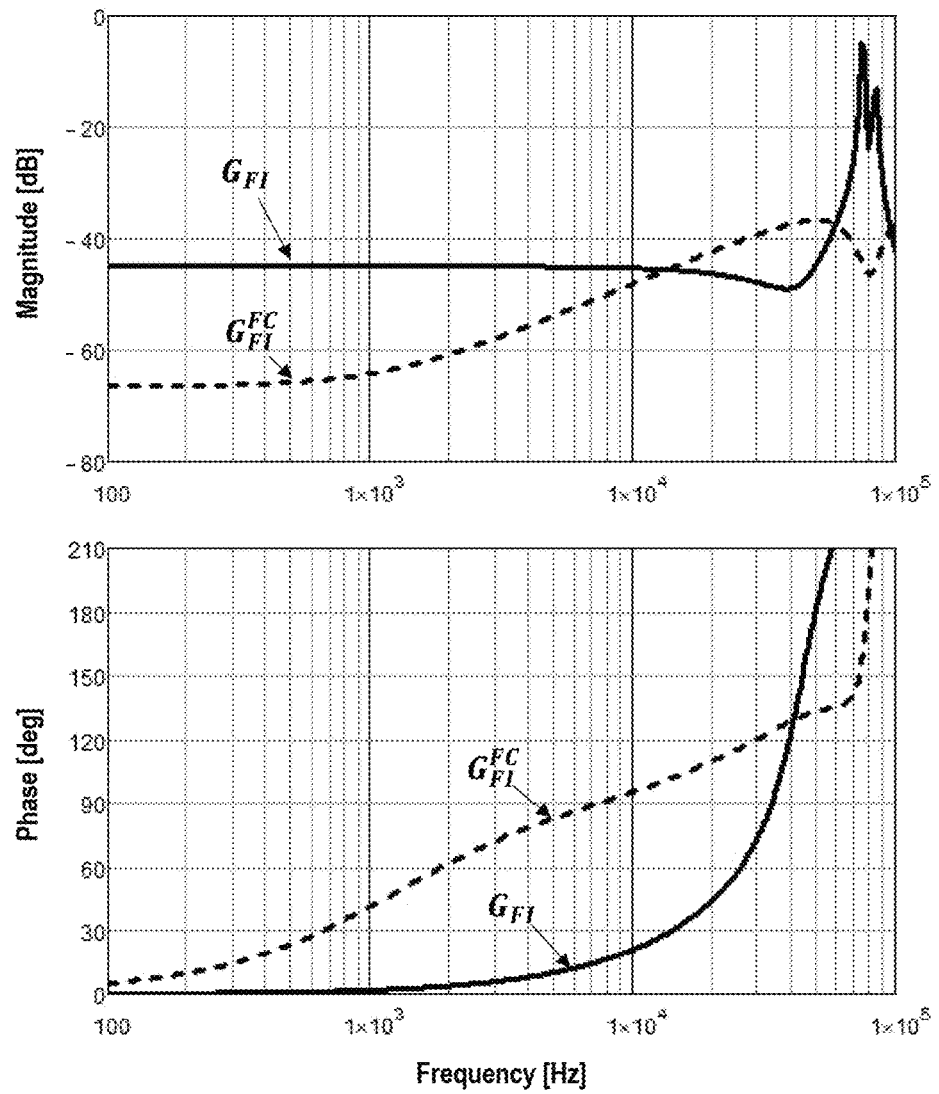
FIG. 26 shows Bode plots of OCF control transfer functions $G_{FI}$ and $G_{FI}^{FC}$ if for the charge control and the direct frequency control, respectively, in accordance with an embodiment of the present disclosure.

As an example, the Bode plots of transfer functions $Z_O^{OL}$, $G_{VC}$, and $G_{FI}^{FC}$ of the full-bridge LLC converter with the DFC are shown in FIG. 25. For comparison, OCF control transfer functions $G_{FI}$ and $G_{FI}^{FC}$ for the charge control and the direct frequency control, respectively, are plotted in FIG. 26. For practical OCF control implementation, approximation of its control function by the constant gain is highly desirable. FIG. 26 reveals that transfer function $G_{FI}$ can be approximated by the constant gain to much higher frequency than transfer function $G_{FI}^{FC}$. For example, the magnitude of transfer function $G_{FI}$ deviates by 3 dB from its dc value at 30.2-kHz frequency, whereas the magnitude of transfer function $G_{FI}^{FC}$ deviates by 3 dB from its dc value at 1.2-kHz frequency. Also the phase of transfer function $G_{FI}$ deviates by 45° from zero value at 20.4-kHz frequency, whereas the phase of transfer function $G_{FI}^{FC}$ deviates by 45° from zero value at 1.1-kHz frequency.

Figure 27:
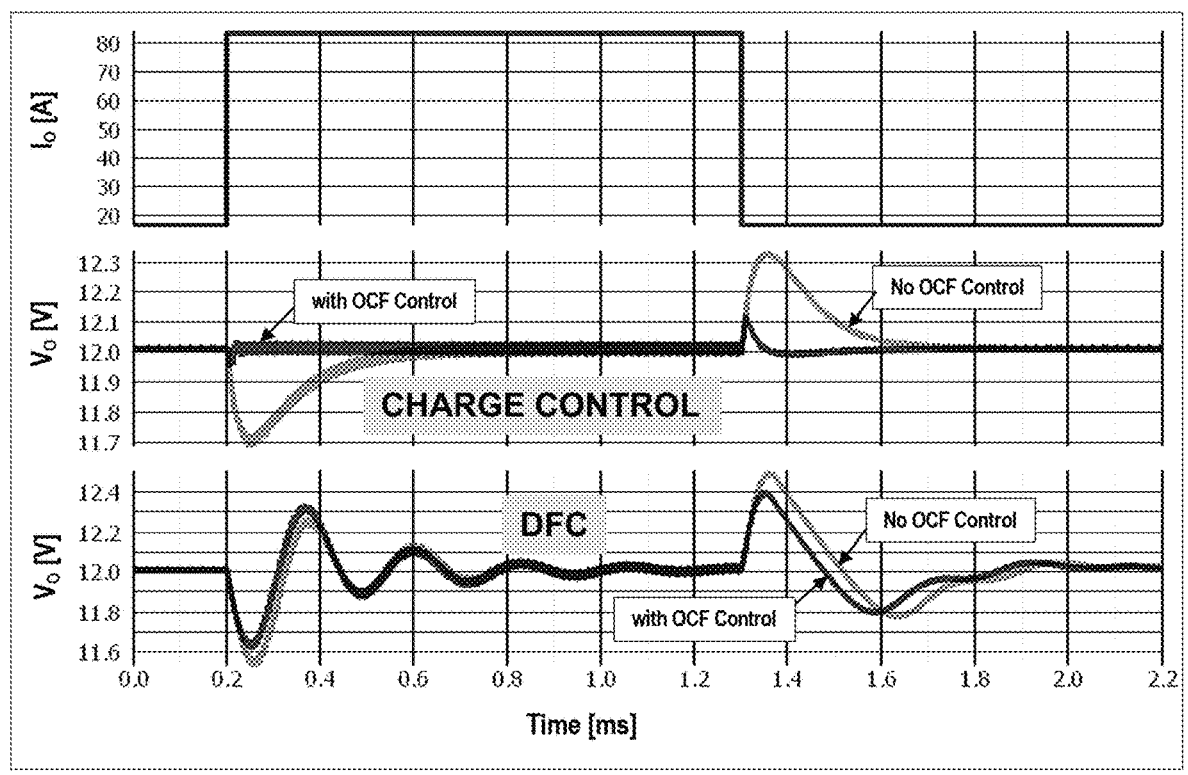
FIG. 27 shows the output voltage response to the output current pulse for an LLC converter with the charge control and for the LLC converter with the DFC, with and without the OCF control, in accordance with an embodiment of the present disclosure.

This is very significant advantage of the combined charge control and OCF control with respect to the combined DFC and OCF control. This advantage is demonstrated in FIG. 27, which shows the LLC converter response to the load disturbance. The upper plot in FIG. 27 shows the output current which steps up from 17 A to 83 A at time t=0.2 ms and steps back to 17 A at t=1.3 ms. The middle plot in FIG. 27 shows the transient waveforms of output voltage $V_O$ for the charge control with and without the OCF control. This plot demonstrates that, with the OCF control added to the charge control, transient output voltage undershoot is reduced by 81% from −323 mV to −60 mV, whereas transient output voltage overshoot is reduced by 65% from 321 mV to 113 mV. The lower plot in FIG. 27 shows the transient waveforms of output voltage $V_O$ for the DFC with and without the OCF control. This plot demonstrates that, with the OCF control added to the DFC, transient output voltage undershoot is reduced by 18% from −477 mV to −391 mV, whereas transient output voltage overshoot is reduced by 20% from 483 mV to 387 mV. The waveforms in FIG. 27 confirm that combination of the charge control with the OCF control is much more beneficial than combination of the DFC with the OCF control.

Figure 28:
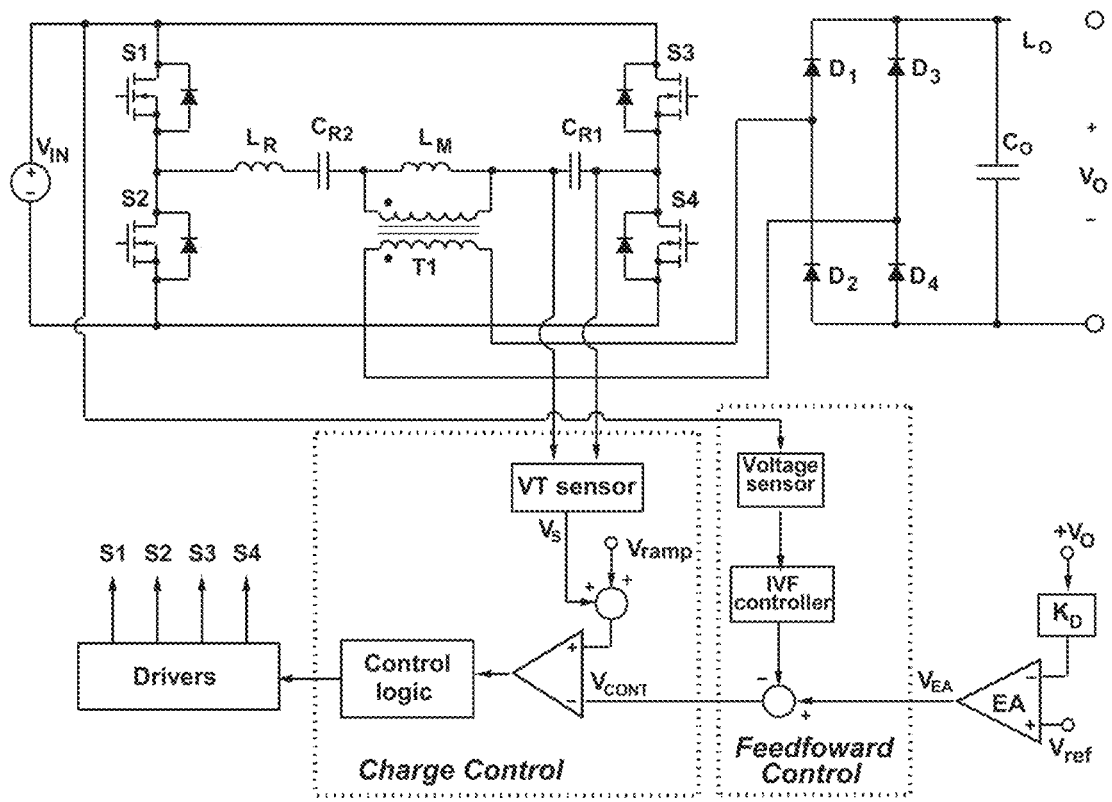
FIG. 28 shows a block diagram of the charge control combined with the input voltage feedforward control in accordance with an embodiment of the present disclosure.
Figure 29:
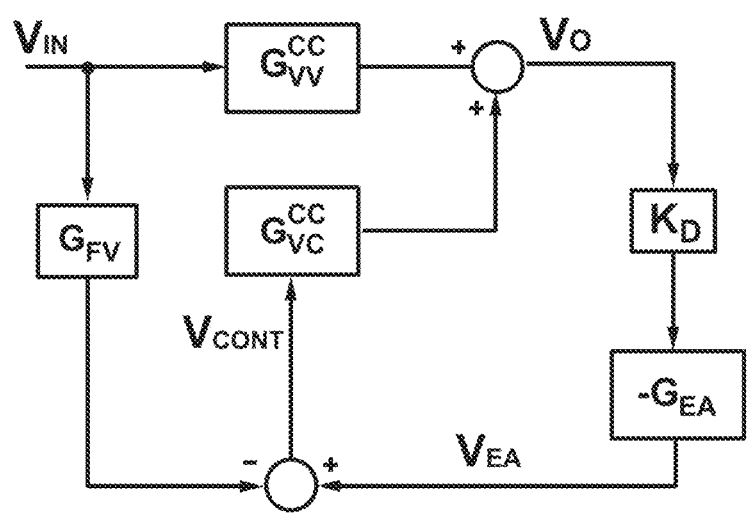
FIG. 29 shows a small-signal block diagram of a resonant converter with the charge control combined with the input voltage feedforward control in accordance with an embodiment of the present disclosure.

The disclosed implementation of the charge control with the input voltage feedforward (IVF) control is presented next. The block diagram of the disclosed control is shown in FIG. 28. To determine the ideal transfer function of the IVF control, the small-signal block diagram of the proposed control, shown in FIG. 29, is employed. The block diagram in FIG. 29 includes:
1. transfer function $G_{VV}^{CC}$ from input voltage \TIN to output voltage $V_O$ with the charge control loop closed and with the voltage feedback and feedforward control paths opened;
2. control-to-output transfer function $G_{VC}^{CC}$ of the charge control;
3. transfer function $K_D$ of output voltage sensor;
4. transfer function $G_{EA}$ of error amplifier;
5. Combined transfer function $G_{FV}$ of the input voltage sensor and feedforward controller.

Transfer function $G_{VV}^{CL}$ from input voltage Vic to output voltage $V_O$ with the feedback and feedforward paths closed is derived from the block diagram in FIG. 29 as $$G_{VV}^{CL} = \frac{V_O}{V_{IN}} = \frac{G_{VV}^{CC} - G_{VC}^{CC} \cdot G_{FV}}{1 + T_V}, \quad (11)$$

where $T_V = K_D \cdot G_{EA} \cdot G_{VC}$ is the voltage feedback loop gain.

Equation (11) indicates that complete cancellation of the small-signal input voltage disturbance is possible when $$G_{FV} = G_{VV}^{CC}/G_{VC}^{CC}. \quad (12)$$

It should be noted that ideal small-signal IVF control transfer function $G_{FV}$, defined by equation (12), cannot completely cancel the input disturbance for the reasons, explained earlier.

Figure 30:
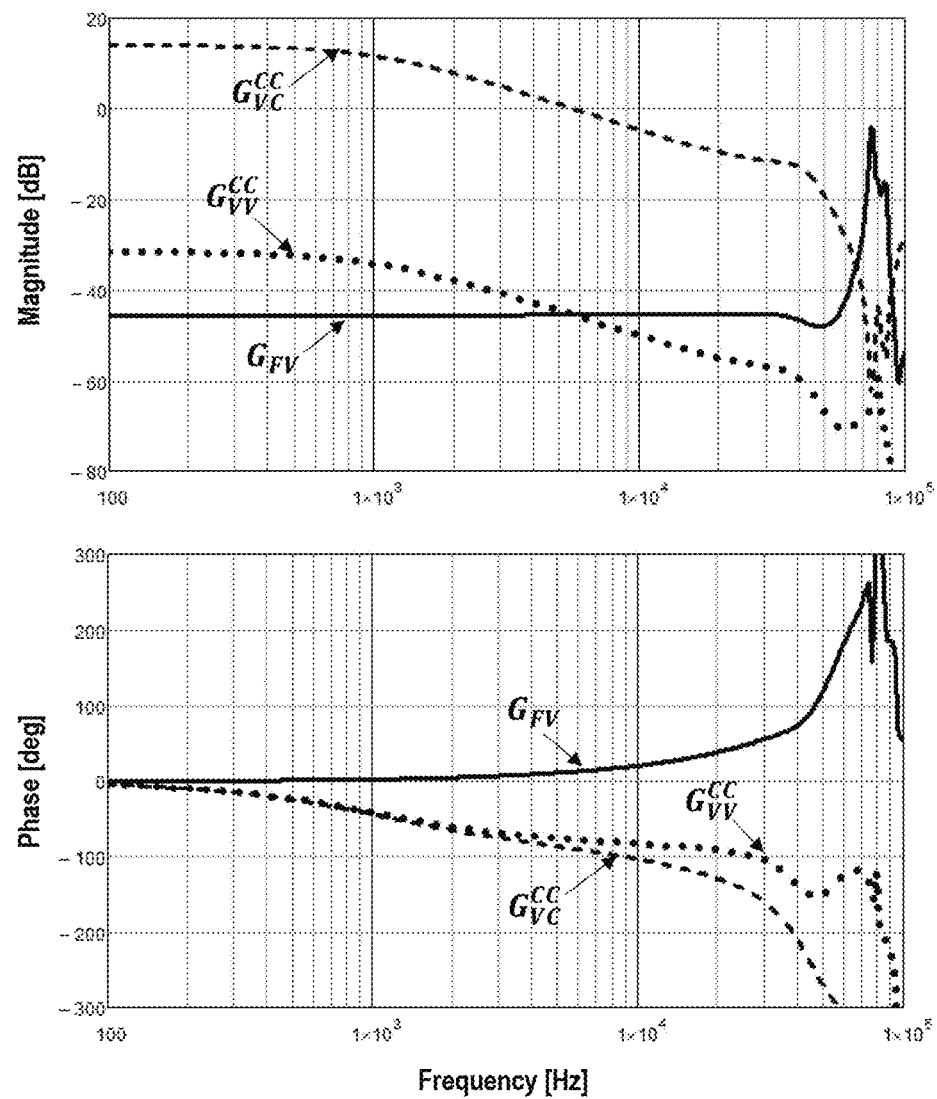
FIG. 30 shows exemplary Bode plots of transfer functions $G_{VV}^{CC}$, $G_{VC}^{CC}$, and $G_{FV}$ of a full-bridge LLC converter with the charge control and the input voltage feedforward control.
Figure 31:
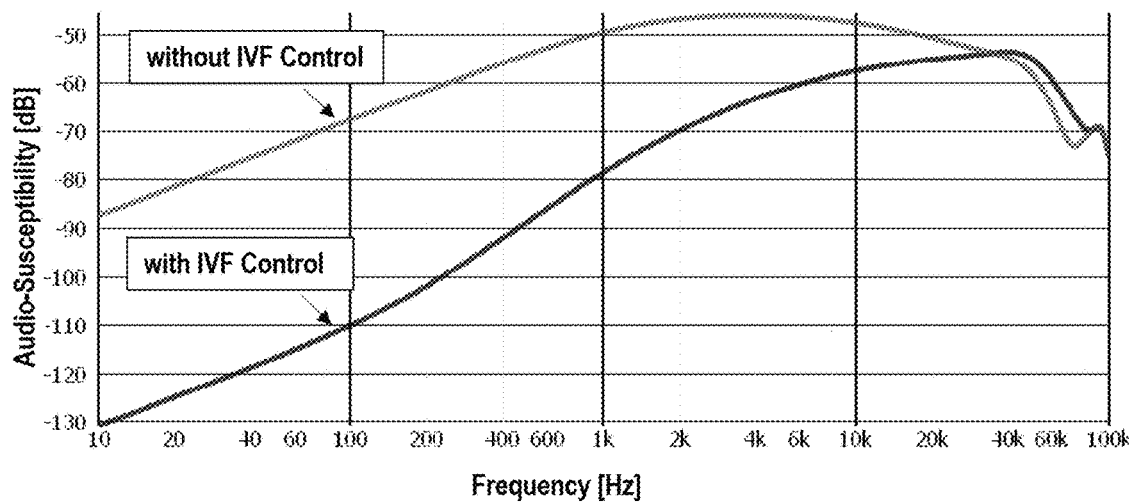
FIG. 31 shows magnitude plots of the closed-loop audio-susceptibility $G_{VV}^{CL}$ for the LLC converter charge control, with and without the input voltage feedforward control, in accordance with an embodiment of the present disclosure.

As an example, the Bode plots of transfer functions $G_{VV}^{CC}$, $G_{VC}^{CC}$, and $G_{FV}$ of the full-bridge LLC converter with the charge control are shown in FIG. 30. At low frequencies, transfer function $G_{FV}$ can be approximated with its dc gain. For example, the $G_{FV}$ magnitude deviates from its dc value by 3 dB at 58.9-kHz frequency, whereas the $G_{FV}$ phase deviates from zero by 45° at 23.4-kHz frequency. For the charge control and transfer function $G_{FV}$ approximated by its dc gain, the Bode plots of input-to-output transfer function $G_{VV}^{CL}$, called closed-loop audio-susceptibility, of the full-bridge LLC converter with and without the IVF control were calculated from (11) and are shown in FIG. 31. In the off-line power supplies, the DC-DC stage is supplied from the front-end stage output which has considerable ripple of the doubled line frequency. The doubled line frequency is typically in the 100-120 Hz range. As the DC-DC stage output voltage has stringent ripple requirements, the low audio-susceptibility at the doubled line frequency is highly important. In FIG. 31, addition of the IVF control to the charge control reduces the audio-susceptibility by 42 dB from −68 dB to −110 dB at 100-Hz frequency.

Figure 32:
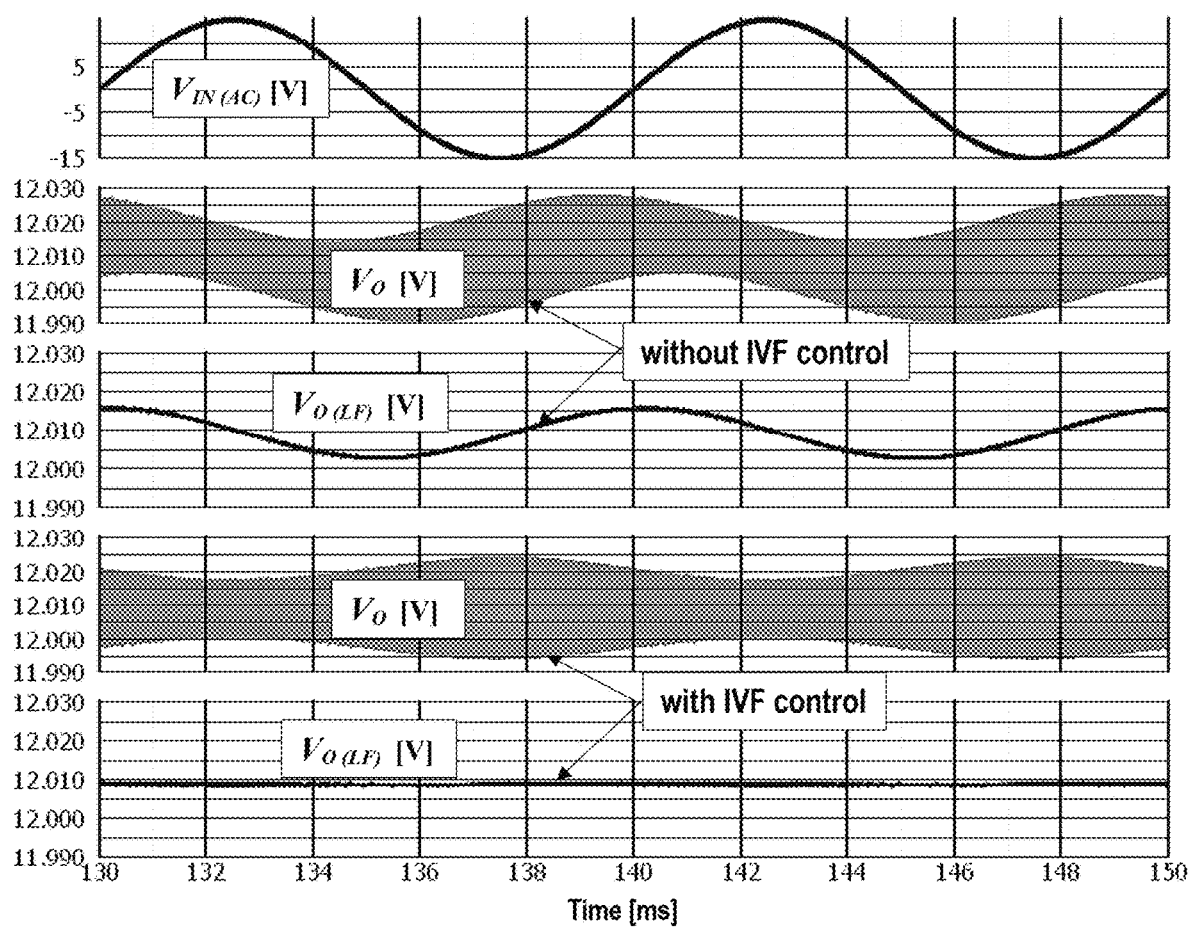
FIG. 32 shows the output voltage response to the input voltage 100-Hz ripple for an LLC converter with the charge control, with and without the IVF control in accordance with an embodiment of the present disclosure.

Simulated input and output voltage waveforms for the charge control with and without the IVF control are shown in FIG. 32. The upper waveform in FIG. 32 is the converter input voltage ac component which has magnitude. The lower waveforms show the converter output voltage and its lower-frequency component. To obtain the lower-frequency component, the converter output voltage signal was processed by the low-pass filter with 2.5-kHz bandwidth. Without the IVF control, the output voltage waveform and its low frequency component in FIG. 32 have 38-mV$_{PP}$ and 13-mV$_{PP}$ ripple, respectively. With the IVF control added, the output voltage waveform and its low frequency component have their ripple reduced to 30-mV$_{PP}$ and 0.64-mV$_{PP}$, respectively. Therefore, the addition of the IVF control reduces the magnitude of the output voltage low frequency component 20.3 times.

Figure 33:
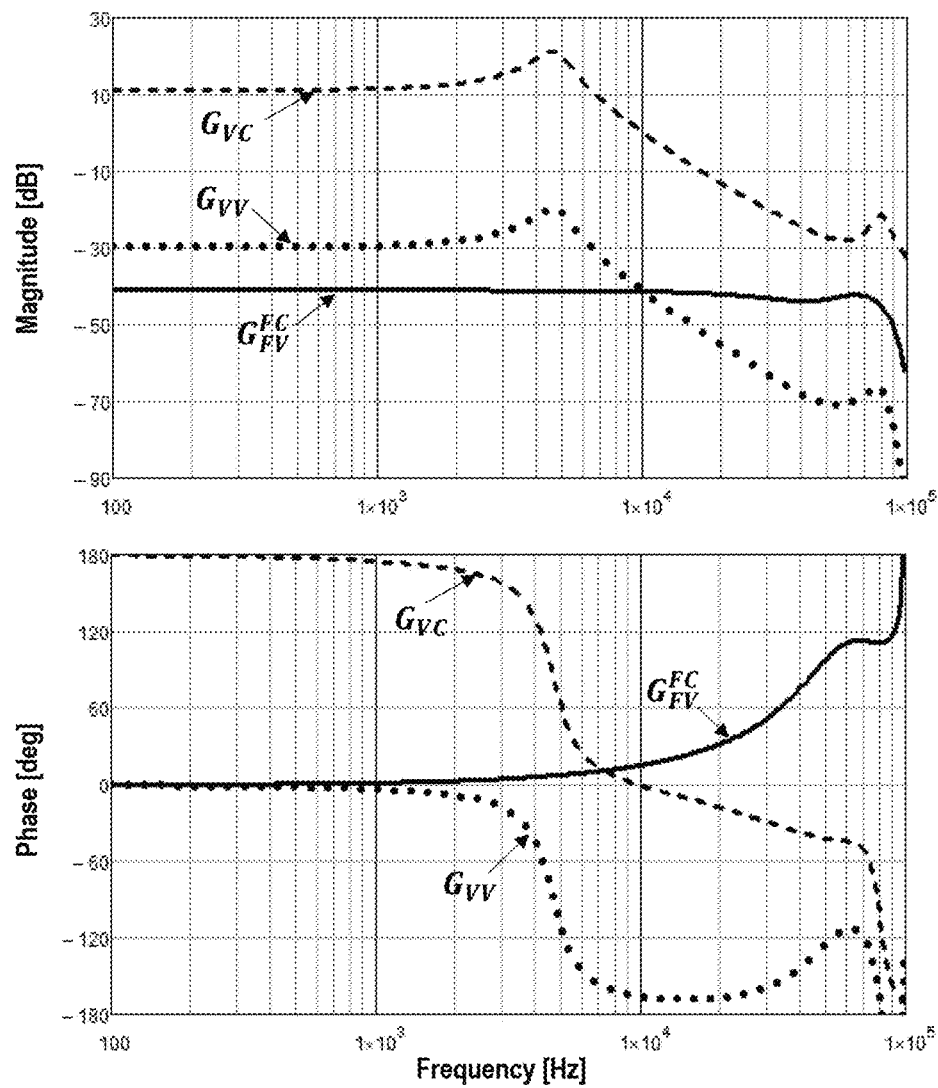
FIG. 33 shows exemplary Bode plots of transfer functions $G_{VV}$, $G_{VC}$, and $G_{FV}^{FC}$ if of a full-bridge LLC converter with the DFC and the input voltage feedforward control in accordance with an embodiment of the present disclosure.

When the IVF control is applied together with the direct frequency control, its ideal transfer function $G_{FV}^{FC}$ if is calculated using equation (2). The Bode plots of transfer functions $G_{VC}$, $G_{VV}$, and $G_{FV}^{FC}$ if of the full-bridge LLC converter with the DFC are shown in FIG. 33. At low frequencies, transfer function $G_{FV}^{FC}$ if can be successfully approximated with its dc gain. For example, the $G_{FV}^{FC}$ if magnitude deviates from its dc value by 3 dB at 77.5-kHz frequency, whereas the $G_{FV}^{FC}$ if phase deviates from zero by 45° at 26.4-kHz frequency.

Figure 34:
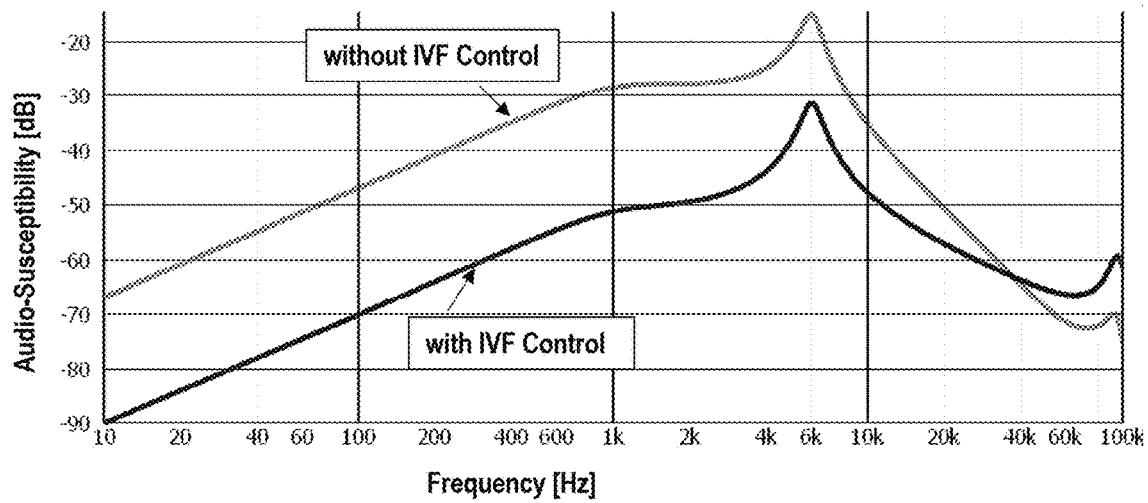
FIG. 34 shows magnitude plots of closed-loop audio-susceptibility $G_{VV}^{CL}$ for DFC, with and without the input voltage feedforward control in accordance with an embodiment of the present disclosure.
Figure 35:
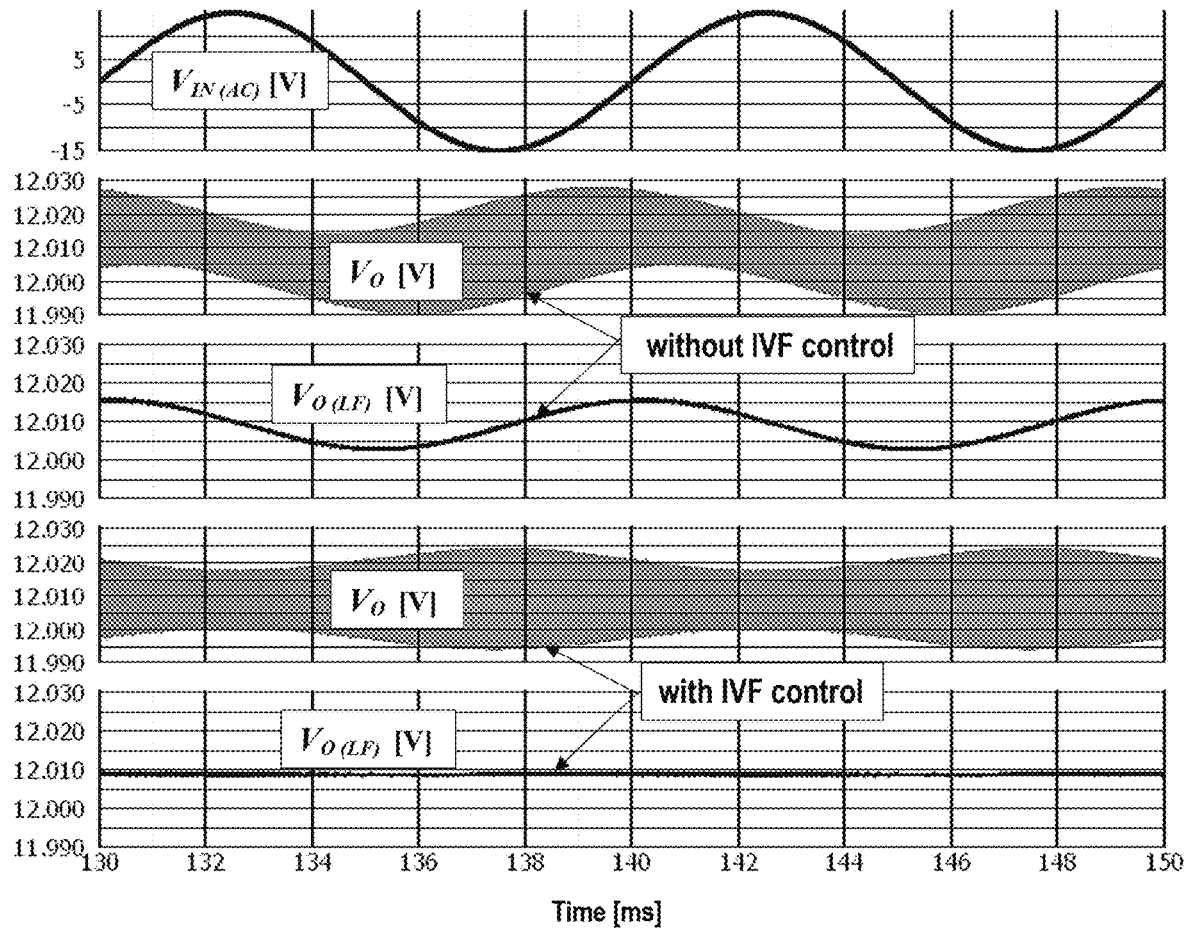
FIG. 35 shows the output voltage response to the input voltage 100-Hz ripple for an LLC converter with the DFC, with and without the IVF control in accordance with an embodiment of the present disclosure.

For the DFC and transfer function $G_{FV}^{FC}$ if approximated by its dc gain, the Bode plots of closed-loop audio-susceptibility $G_{VV}^{CL}$ of the full-bridge LLC converter with and without the IVF control were calculated from (1) and are shown in FIG. 34. According to FIG. 34, addition of the IVF control to the DFC reduces the audio-susceptibility by 23 dB from −47 dB to −70 dB at 100-Hz frequency. Simulated input and output voltage waveforms for the DFC with and without the IVF control are shown in FIG. 35. The upper waveform in FIG. 35 is the converter input voltage ac component which has 30-V$_{PP}$ magnitude. The lower waveforms show the converter output voltage and its lower-frequency component. Without the IVF control, the output voltage waveform and its low frequency component in FIG. 35 have 161-m V$_{PP}$ and 49-mV$_{PP}$ ripple, respectively. With the IVF control added, the output voltage waveform and its low frequency component have their ripple reduced to 49.4-mVPP and 24-mVPP, respectively. Therefore, the addition of the IVF control reduces the magnitude of the output voltage low frequency component 5.8 times. Hence, the presented data confirms that addition of the IVF control to the charge control has more performance benefits than addition of the IVF control to the direct frequency control.

Therefore, the combined charge and feedforward controls disclosed herein have significantly better performance with respect to the combined direct frequency and feedforward controls.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed modified by a term of degree (e.g., "about"), thereby reflecting its intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. An isolated DC-DC converter comprising:
   a full-bridge switching stage having a plurality of active switches;
   a resonant network having a plurality of resonant components;
   a transformer connected to the resonant network;
   an output stage connected to the transformer and configured to generate an output voltage;
   an error amplifier configured to generate a voltage error signal based on the output voltage and a reference voltage;
   a feedforward controller configured to sense an input voltage of the full bridge switching stage and/or an output current of the output stage, and generate a feedforward control signal based on the sensed signal;
   an isolated charge sensor connected to the resonant network and configured to generate a charge sensing signal corresponding to one of the resonant components; and
   a switch controller configured to generate and provide control signals to the plurality of active switches in charge control mode based on at least the voltage error signal, the feedforward control signal and the charge sensing signal.

2. The isolated DC-DC converter of claim 1, wherein the plurality of resonant components comprises at least a resonant inductor and a resonant capacitor, and the charge sensing signal corresponds to the resonant inductor or the resonant capacitor.

3. The isolated DC-DC converter of claim 2, wherein the plurality of resonant components comprises at least a resonant inductor and two series-connected resonant capacitors.

4. The isolated DC-DC converter of claim 2, wherein the charge sensing signal corresponds to an inductor current flowing through the resonant inductor or a capacitor voltage across the resonant capacitor.

5. The isolated DC-DC converter of claim 4, wherein the isolated charge sensor is implemented as a voltage transformer, a current transformer or sensing winding of a resonant magnetic component.

6. The isolated DC-DC converter of claim 5, wherein the isolated charge sensor is implemented as the sensing winding of the resonant magnetic component and is configured to generate the charge sensing signal corresponding to the inductor current flowing through the resonant inductor.

7. The isolated DC-DC converter of claim 6, wherein the sensing winding of the resonant inductor is followed by a double integration circuit.

8. The isolated DC-DC converter of claim 4, wherein the isolated charge sensor is implemented as the current transformer, and is configured to generate the charge sensing signal corresponding to the inductor current flowing through the resonant inductor.

9. The isolated DC-DC converter of claim 8, wherein the current transformer comprises a transformer with turns ratio 1:N and an integrator circuit.

10. The isolated DC-DC converter of claim 4, wherein the isolated charge sensor is implemented as the voltage transformer and is configured to generate the charge sensing signal corresponding to the capacitor voltage across one of the series-connected resonant capacitors.

11. The isolated DC-DC converter of claim 1, wherein the feedforward controller comprises a voltage feedforward controller configured to sense the input voltage of the full bridge switching stage, and/or a current feedforward controller configured to sense the output current of the output stage.

12. The isolated DC-DC converter of claim 11, wherein an output of the current feedforward controller or the voltage feedforward controller is configured to combine with the voltage error signal, and combined signal is served as an input signal of the switch controller.

13. The isolated DC-DC converter of claim 11, wherein the current feedforward controller is configured to sense the output current, and produce a current feedforward output based on the output current, and wherein the voltage feedforward controller is configured to sense the input voltage, and produce a voltage feedforward output based on the input voltage.

14. The isolated DC-DC converter of claim 13, wherein the current feedforward output is summed with the voltage error signal, and wherein the voltage feedforward output is subtracted from the voltage error signal.

* * * * *